(12) United States Patent
Hasegawa et al.

(10) Patent No.: US 8,232,341 B2
(45) Date of Patent: Jul. 31, 2012

(54) RUBBER COMPOSITION AND USE THEREOF

(75) Inventors: Tomonori Hasegawa, Fujisawa (JP); Kuniyoshi Kawasaki, Fujisawa (JP)

(73) Assignee: NOK Corporation, Tokyo (JP)

( * ) Notice: Subject to any disclaimer, the term of this patent is extended or adjusted under 35 U.S.C. 154(b) by 108 days.

(21) Appl. No.: 12/735,106

(22) PCT Filed: Mar. 31, 2008

(86) PCT No.: PCT/JP2008/056314
§ 371 (c)(1),
(2), (4) Date: Jun. 16, 2010

(87) PCT Pub. No.: WO2009/078185
PCT Pub. Date: Jun. 25, 2009

(65) Prior Publication Data
US 2011/0092631 A1     Apr. 21, 2011

(30) Foreign Application Priority Data

Dec. 17, 2007   (JP) .................................. 2007-324439

(51) Int. Cl.
*C08K 3/34* (2006.01)
*C08K 5/24* (2006.01)

(52) U.S. Cl. ........................ 524/493; 524/261

(58) Field of Classification Search .................... 524/493
See application file for complete search history.

(56) References Cited

U.S. PATENT DOCUMENTS

| | | | |
|---|---|---|---|
| 5,610,254 A | 3/1997 | Sagane et al. | |
| 5,696,214 A | 12/1997 | Sagane et al. | |
| 5,807,948 A | 9/1998 | Sagane et al. | |
| 5,922,823 A | 7/1999 | Sagane et al. | |
| 2003/0200900 A1 | 10/2003 | Korth et al. | |
| 2004/0067380 A1 | 4/2004 | Maeda et al. | |
| 2005/0020740 A1* | 1/2005 | Matsunaga et al. ........... | 524/261 |
| 2005/0026023 A1 | 2/2005 | Hirai et al. | |
| 2006/0142437 A1 | 6/2006 | Hakuta et al. | |

FOREIGN PATENT DOCUMENTS

| | | |
|---|---|---|
| EP | 1 357 156 A2 | 10/2003 |
| EP | 1 357 156 A3 | 1/2004 |
| EP | 1 464 670 A1 | 10/2004 |
| EP | 1 510 544 A1 | 3/2005 |
| EP | 1 605 015 A1 | 12/2005 |
| JP | 7-102248 | 11/1995 |
| JP | 09-071617 A | 3/1997 |
| JP | 09-071618 A | 3/1997 |
| JP | 09-208615 A | 8/1997 |
| JP | 10-067823 A | 3/1998 |
| JP | 10-067824 A | 3/1998 |
| JP | 10-110054 A | 4/1998 |
| JP | 11-35635 | 2/1999 |
| JP | 2961068 B1 | 7/1999 |
| JP | 11-323030 | 11/1999 |
| JP | 2000-309709 | 11/2000 |
| JP | 2002-212342 | 7/2002 |
| JP | 2002-348415 | 12/2002 |
| JP | 2004-204181 | 7/2004 |
| JP | 2005-50666 | 2/2005 |
| JP | 2006-282887 | 10/2006 |
| JP | 2007-63465 | 3/2007 |
| WO | WO 00/43447 A1 | 7/2000 |
| WO | WO 03/005777 A1 | 7/2003 |

OTHER PUBLICATIONS

Saeki et al., "Polymer Production Process", Kogyo Chosakai Publishing Inc., 1994, pp. 365-378 with full English translation.
International Search Report received in corresponding International application No. PCT/JP2008/056314.
European Search Report; EP Appln. No. 08739428.4; issued Apr. 15, 2011; 4 pgs.

* cited by examiner

*Primary Examiner* — Ling Choi
*Assistant Examiner* — Hui Chin
(74) *Attorney, Agent, or Firm* — Foley & Lardner LLP

(57) ABSTRACT

Provided is a rubber composition capable of providing a molding having: excellent sealing properties, heat resistance, and acid resistance; a low reaction force and low hardness; a reduced compression set; and especially an improved compression set and unsusceptibility to compression cracking at high temperatures. Also provided are a use of the rubber composition and a main body comprising the rubber composition mounted thereon. The rubber composition contains a specific ethylene/α-olefin/non-conjugated polyene copolymer [A], carbon black [B], and surface-modified silica [C] that is obtained by subjecting precipitated silica to surface modification and has a BET specific surface area of 30 to 80 $m^2/g$, a particle diameter of 1.0 to 4.0 μm as measured by the Coulter counter method, and an M value of 50 or more.

18 Claims, 1 Drawing Sheet

[Fig.1]
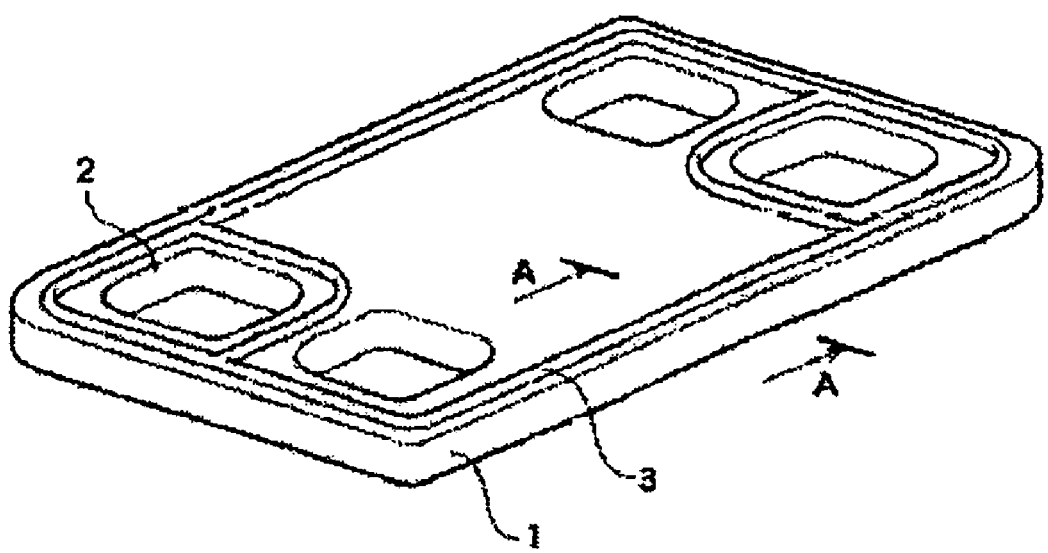
[Fig.2]
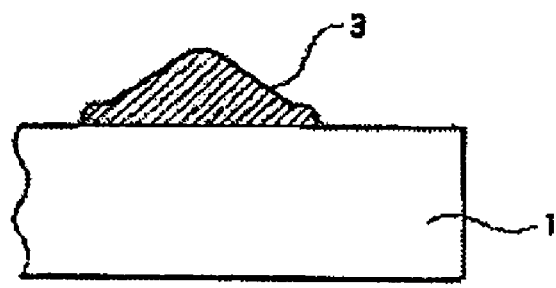

RUBBER COMPOSITION AND USE THEREOF

TECHNICAL FIELD

The present invention relates to a rubber composition and a use thereof. More specifically, the present invention relates to a rubber composition that can be suitably used in a fuel cell sealing member, various gasket members such as a gasket member for LIM molding, a sealing member for an electric wire connector, and the like; a fuel cell sealing member, a hard disk drive top cover gasket, a gasket member for LIM molding, and an electric wire connector sealing member, all of which are obtained using the rubber composition; and a main body comprising any of these mounted thereon.

BACKGROUND ART

Sealing components and gasket components used in electrical appliances or the like are essentially required to be excellent in terms of barrier properties, sealing properties etc., to satisfy a desired hardness, to have high heat resistance for withstanding heat generated during the flow of electric current, and to be usable even in low-temperature environments.

For example, fuel cells are efficient and clean power generation systems, in which electricity is directly produced by the reverse reaction of electrolysis of water, i.e., by allowing hydrogen and oxygen to chemically react with each other, and the system attracts attention as novel energy systems for automobiles and household appliances. Cell sealing members for fuel cells or the like have required a low-cost material excellent in terms of heat resistance, acid resistance, gas permeation resistance, and high-speed moldability. Under present circumstances, a fluororubber is used in terms of heat resistance and acid resistance, a butyl rubber is used in terms of gas permeation resistance, and a silicone rubber is used in terms of heat resistance and moldability. However, when the high-speed moldability is required, normal millable silicone rubbers are insufficient to meet the requirement. In such a case, for example, a liquid silicone rubber is used and liquid injection molding (LIM) is applied. Silicone rubber is excellent in terms of heat resistance and high-speed moldability, but is insufficient in terms of acid resistance and gas permeation resistance.

Furthermore, there has been studied for increasing the power generation reaction temperature of fuel cells in order to further improve power generation performance. Accordingly, sealing members (gasket members) also require higher high-temperature durability.

Meanwhile, with the reduction in the size and increase in performance of electronic devices, reductions in the size and thickness of components constituting such products have been desired. However, the reduction in the size of the components degrades assembly workability in manufacturing. Therefore, integration and combination of various components have been desired.

For example, a gasket for a hard disk drive, which is an electronic storage device, is often used in a form that a simple rubber or a urethane foam sheet and a metal cover, such as a stainless steel cover or an aluminum cover, are bonded with an adhesive to be integrated. However, not only the above integration process but also reductions in the weight and thickness of the metal cover are implemented, and therefore the gasket with a high hardness (reaction force) causes a problem of deformation of the cover.

Under these circumstances, a styrene thermoplastic elastomer has been proposed as a gasket material (Patent Document 1). The document describes that such a styrene thermoplastic elastomer has a low hardness and does not need a vulcanization process differently from rubber materials, and thus the production process can be simplified and the elastomer can be recycled.

However, the elastomer is often applied to hard disk drives involving heat generated due to an increase in the performance (high rotational speed) or automobiles, and tends to be used under high-temperature environments, for example, at 80° C. or higher. Such environments caused a problem of permanent set at high temperatures, which is one of mechanical properties of the styrene thermoplastic elastomer. This showed a limitation in terms of the performance of the elastomer. Consequently, it is desirable to realize a gasket member which has further improved high-temperature durability, low hardness, and low compression set ratio, and which exhibits sealing properties with a low reaction force even under high compression.

Electric wire connectors are used for connecting and branching electric wires, and comprises a pair of male and female resin frames that can be connected to each other through one-touch operation, an electric wire, and a sealing member. The sealing member is mainly used as a dust seal between the electric wire and the resin frame. For the electric wire connector sealing member used in this type of connector, sealing properties and insertion properties for thin electric wires are required, and heretofore, low-hardness and oil-bleeding type silicone rubber and nitrile rubber have been used. However, these rubbers mainly contain silicone oil as a plasticizer, and thus the plasticizer adheres to electrical contact points during the use, thereby causing troubles in the flow of electric current due to insulation at the electrical contact points.

Under these circumstances, Patent Document 2 proposes a rubber composition which is excellent in terms of high-speed moldability and excellent in heat resistance, acid resistance, and gas permeation resistance, and which is suitably used in a sealing member for a fuel cell, a gasket member for an electronic device such as a hard disk drive, a sealing member for an electric wire connector, and the like. This rubber composition is a liquid rubber composition that can be processed by LIM molding, and can provide moldings having a low hardness. Accordingly, the rubber composition is suitable for a fuel cell sealing member, a gasket member for hard disk drives, and the like, for which sealing properties with a low reaction force under high compression are also required. However, a further improvement in high-temperature durability has been desired for moldings such as gaskets and sealing components, and improvements not only in the compression set properties at high temperatures but also in unsusceptibility to compression cracking under high temperatures and high strain have been desired. However, such a rubber composition is inferior to silicone rubbers and the like in terms of elastic recovery ratio in low-temperature environments, and therefore, a further improvement has been desired in the mechanical properties in low-temperature environments.

A sealing member for stationary fuel cells for household use has required a compression set ratio of 80% or less after standing at 90° C. for 40,000 hours. However, the sealing member has a problem that the compression set ratio significantly deteriorates from 5,000 hours to 10,000 hours. Accordingly, a rubber composition having a further improved long-term compression set ratio at high temperatures has been strongly desired.

Patent Document 1: Japanese Patent No. 2961068
Patent Document 2: International Publication WO03/057777

DISCLOSURE OF INVENTION

Problems to be Solved by the Invention

The present invention provides a rubber composition capable of providing a molding having: excellent sealing properties, heat resistance, acid resistance, and high-speed moldability; a low hardness and a low reaction force; an improved low-temperature recovery that contributes to sealing properties in low-temperature environments and unsusceptibility to cracking under high compression; and in particular, an improved compression set ratio at high temperatures for a long time. The present invention also provides uses of the rubber composition and a main body comprising the rubber composition mounted thereon.

Means for Solving the Problems

A rubber composition of the present invention contains an ethylene/α-olefin/non-conjugated polyene copolymer [A] that satisfies (a) to (e) below:
(a) the copolymer is a copolymer of ethylene, an α-olefin, and a non-conjugated polyene,
(b) the α-olefin has 3 to 20 carbon atoms,
(c) the weight ratio of ethylene unit/α-olefin unit is 35/65 to 95/5,
(d) the iodine value is in the range of 0.5 to 50, and
(e) the intrinsic viscosity [η] is 0.01 to 5.0 dl/g as measured in a decalin solution at 135° C.;
carbon black [B] having an amount of iodine adsorption of 80 mg/g or less, an average particle diameter of 250 nm or less, and an amount of DBP absorption of 10 to 300 cm³/100 g; and
surface-modified silica [C] that is obtained by subjecting precipitated silica to surface modification and has a BET specific surface area of 30 to 80 m²/g, a particle diameter of 1.0 to 4.0 μm as measured by the Coulter counter method, and an M value of 50 or more.

In the rubber composition of the present invention, preferably, the ethylene/α-olefin/non-conjugated polyene copolymer [A] further satisfies (f) below:
(f) the non-conjugated polyene is at least one kind of norbornene compound represented by general formula [I] below.

[Chem. 1]

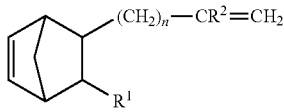

[I]

(In formula [I], n is an integer of 0 to 10, $R^1$ is a hydrogen atom or an alkyl group of 1 to 10 carbon atoms, and $R^2$ is a hydrogen atom or an alkyl group of 1 to 5 carbon atoms.)

In the rubber composition of the present invention, preferably, the carbon black [B] is contained in an amount of 1 to 40 parts by weight and the surface-modified silica [C] is contained in an amount of 20 to 60 parts by weight relative to 100 parts by weight of the total amount of the ethylene/α-olefin/non-conjugated polyene copolymer [A] and other resin components contained in the rubber composition.

In the rubber composition of the present invention, preferably, the resin component in the rubber composition is only the ethylene/α-olefin/non-conjugated polyene copolymer [A].

In the rubber composition of the present invention, the carbon black [B] preferably has an amount of iodine adsorption of 15 to 40 mg/g, an average particle diameter of 40 to 100 nm, and an amount of DBP absorption of 40 to 150 cm³/100 g.

Preferably, the rubber composition of the present invention further contains a crosslinking agent [D].

When the rubber composition of the present invention contains the crosslinking agent [D], the crosslinking agent [D] preferably contains an SiH group-containing compound (1) having two SiH groups in one molecule and represented by general formula [II] below.

[Chem. 2]

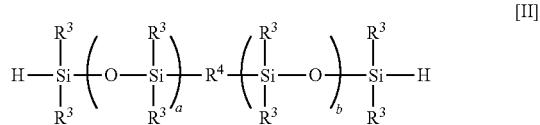

[II]

(In formula [II], $R^3$s are each a monovalent group having 1 to 10 carbon atoms and are each an unsubstituted or substituted saturated hydrocarbon group or an aromatic hydrocarbon group, $R^3$s may be the same or different in one molecule, a is an integer of 0 to 20, b is an integer of 0 to 20, and $R^4$ is a divalent organic group of 1 to 30 carbon atoms or an oxygen atom.)

Also, when the rubber composition of the present invention contains the crosslinking agent [D], the crosslinking agent [D] preferably contains an SiH group-containing compound (2) having three SiH groups in one molecule and represented by general formula [III] below.

[Chem. 3]

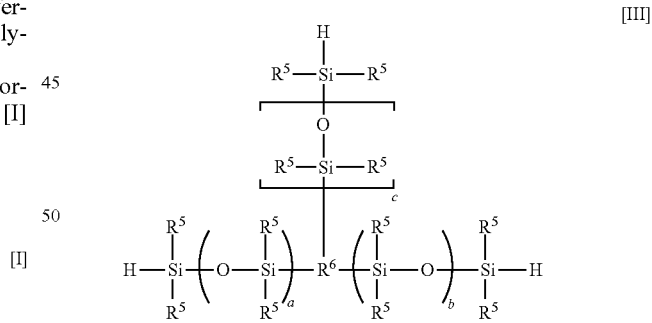

[III]

(In formula [III], $R^5$s are each a monovalent group having 1 to 10 carbon atoms and are each an unsubstituted or substituted saturated hydrocarbon group or an aromatic hydrocarbon group, $R^5$s may be the same or different in one molecule, a, b, and c are each independently an integer of 0 to 20, and $R^6$ is a trivalent organic group having 1 to 30 carbon atoms.)

When the rubber composition of the present invention contains the SiH group-containing compound (1) having two SiH groups in one molecule, the SiH group-containing compound (1) having two SiH groups in one molecule is contained preferably in an amount of 3.0 to 7.0 parts by weight relative to 100 parts by weight of the total amount of the ethylene/α- olefin/non-conjugated polyene copolymer [A] and other resin components contained in the rubber composition.

When the rubber composition of the present invention contains the SiH group-containing compound (2) having three SiH groups in one molecule, the SiH group-containing compound (2) having three SiH groups in one molecule is contained preferably in an amount of 0.1 to 2.0 parts by weight relative to 100 parts by weight of the total amount of the ethylene/α-olefin/non-conjugated polyene copolymer [A] and other resin components contained in the rubber composition.

A fuel cell sealing member of the present invention comprises the rubber composition of the present invention.

A fuel cell of the present invention comprises a fuel cell sealing member comprising the rubber composition of the present invention.

A hard disk drive of the present invention comprises a hard disk drive top cover gasket comprising the rubber composition of the present invention.

A sealing member for an electric wire connector of the present invention comprises the rubber composition of the present invention.

An electric wire connector of the present invention comprises a sealing member for an electric wire connector comprising the rubber composition of the present invention. The electric wire connector of the present invention is preferably an electric wire connector for automobiles.

Effect of the Invention

The rubber composition of the present invention is suitable for LIM molding. Moldings using the rubber composition has excellent sealing properties, heat resistance, and acid resistance; a low reaction force and a low hardness; excellent low-temperature recovery, which contributes to sealing properties in low-temperature environments; low compression set at high temperatures for a long time; and excellent compression recovery. The rubber composition of the present invention does not cause oil bleeding, blooming, or the like, and can provide moldings that are excellent in terms of mechanical properties and resistance to outgassing. When a connector seal for an electric wire is molded with the rubber composition, the seal has excellent sealing properties and insertion properties for electric wires. The rubber composition is suitable for a fuel cell sealing member, a gasket member for LIM molding, and a sealing member for an electric wire connector. The fuel cell, hard disk drive top cover gasket, hard disk drive, electric wire connector, and the like of the present invention are each provided with a molding comprising the rubber composition of the present invention. The molding has excellent sealing properties, heat resistance, and acid resistance, and has a low reaction force and a low hardness. In particularly, the molding has a low compression set under high temperature conditions, and excellent compression recovery.

BRIEF DESCRIPTION OF DRAWINGS

FIG. 1 is a perspective view showing an example of a separator-integrated cell sealing component for a fuel cell.

FIG. 2 is a schematic cross-sectional view taken along line A-A in FIG. 1.

REFERENCE NUMERALS 1 carbon, metal, or resin separator of separator-integrated cell for fuel cell
2 space
3 sealing member of cell

BEST MODES FOR CARRYING OUT THE INVENTION

The present invention will now be specifically described.
<Rubber Composition>

A rubber composition of the present invention contains, as essential components, a specific ethylene/α-olefin/non-conjugated polyene copolymer [A], carbon black [B], and surface-modified silica [C], and, if necessary, further contains a crosslinking agent [D].

[A] Ethylene/α-Olefin/Non-Conjugated Polyene Copolymer

The copolymer [A] used in the present invention satisfies (a) to (e) below and preferably satisfies (a) to (f) below:
(a) the copolymer [A] is a copolymer of ethylene, an α-olefin, and a non-conjugated polyene;
(b) the α-olefin has 3 to 20 carbon atoms;
(c) the weight ratio of ethylene unit/α-olefin unit is 35/65 to 95/5;
(d) the iodine value is in the range of 0.5 to 50;
(e) the intrinsic viscosity [η] is 0.01 to 5.0 dl/g as measured in a decalin solution at 135° C.; and
(f) the non-conjugated polyene is at least one kind of norbornene compound represented by general formula [I] above.

The copolymer [A] according to the present invention is a copolymer of ethylene, an α-olefin of 3 to 20 carbon atoms, and a non-conjugated polyene and is preferably a random copolymer thereof.

α-Olefin

The α-olefin contained in the copolymer [A] is an α-olefin of 3 to 20 carbon atoms. Specific examples thereof include propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene 1-nonadecene, 1-eicosene, 9-methyl-1-decene, 11-methyl-1-dodecene, and 12-ethyl-1-tetradecene. Among these, α-olefins of 3 to 10 carbon atoms are more preferable, and in particular, propylene, 1-butene, 1-hexene, and 1-octene are most preferably used. These α-olefins are used alone or in combination of two or more kinds thereof.

Non-Conjugated Polyene

The non-conjugated polyene contained in the copolymer [A] is not particularly limited, but is preferably a non-conjugated diene and more preferably at least one kind of norbornene compound represented by general formula [I] below.

[Chem. 4]

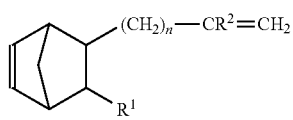

[I]

(In formula [I], n is an integer of 0 to 10, $R^1$ is a hydrogen atom or an alkyl group of 1 to 10 carbon atoms, and $R^2$ is a hydrogen atom or an alkyl group of 1 to 5 carbon atoms.)

Specific examples of the norbornene compounds represented by general formula [I] include 5-vinyl-2-norbornene, 5-(2-propenyl)-2-norbornene, 5-(3-butenyl)-2-norbornene, 5-(1-methyl-2-propenyl)-2-norbornene, 5-(4-pentenyl)-2-norbornene, 5-(1-methyl-3-butenyl)-2-norbornene, 5-(5-hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methyl-5-hexenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene, and 5-(1,2,3-trimethyl-4-pentenyl)-2-norbornene.

Among these, 5-vinyl-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(6-heptenyl)-2-norbornene, and 5-(7-octenyl)-2-norbornene are preferable. These norbornene compounds may be used alone or in combination of two or more kinds thereof.

The non-conjugated polyene contained in the copolymer [A] of the present invention may be non-conjugated polyenes other than the norbornene compound represented by general formula [I] above. Examples of the non-conjugated polyenes that may be used include, but are not particularly limited to, the following chain non-conjugated dienes, and alicyclic non-conjugated diene and triene compounds. These non-conjugated polyenes may be used alone or in combination of two or more kinds of thereof. The non-conjugated polyenes other than the norbornene compound represented by general formula [I] may be used together with the norbornene compound represented by general formula [I].

Specific examples of the chain non-conjugated dienes include 1,4-hexadiene, 3-methyl-1,4-hexadiene, 4-methyl-1,4-hexadiene, 5-methyl-1,4-hexadiene, 4,5-dimethyl-1,4-hexadiene, and 7-methyl-1,6-octadiene.

Specific examples of the cyclic non-conjugated dienes include 5-methylene-2-norbornene, 1-methyl-5-methylene-2-norbornene, 1-ethyl-5-methylene-2-norbornene, 5-ethylidene-2-norbornene, 5-isopropylidene-2-norbornene, 5-vinylidene-2-norbornene, 6-chloromethyl-5-isopropenyl-2-norbornene, dicyclopentadiene, and methyltetrahydroindene.

Further specific examples of compounds other than the above compounds include trienes such as 2,3-diisopropylidene-5-norbornene, 2-ethylidene-3-isopropylidene-5-norbornene, and 2-propenyl-2,2-norbornadiene.

Composition and Properties of Copolymer [A]

The copolymer [A] according to the present invention has a ratio of ethylene unit/α-olefin unit of, in terms of weight ratio, in the range of 35/65 to 95/5, preferably 40/60 to 90/10, more preferably 45/55 to 85/15, and particularly preferably 50/50 to 80/20.

A rubber composition having the weight ratio within the above range is capable of providing crosslinked rubber moldings that are excellent not only in heat aging resistance, strength properties, and rubber elasticity but also in cold resistance and processability.

The iodine value of the copolymer [A] according to the present invention is 0.5 to 50 (g/100 g), preferably 1 to 45, more preferably 1 to 43, and particularly preferably 3 to 40 (g/100 g).

When the iodine value is within the above range, a rubber composition having a high crosslinking efficiency is obtained. The rubber composition obtained is capable of providing crosslinked rubber moldings that are excellent not only in compression set resistance but also in environmental degradation resistance (i.e., heat aging resistance). If the iodine value exceeds the above range, in some cases, the crosslinking density becomes too high and mechanical properties such as tensile elongation are deteriorated.

The intrinsic viscosity $[\eta]$ of the copolymer [A] according to the present invention is 0.01 to 5.0 dl/g, preferably 0.03 to 4.0 dl/g, more preferably 0.05 to 3.5 dl/g, and particularly preferably 0.07 to 3.0 dl/g, as measured in decalin at 135° C. An embodiment in which the intrinsic viscosity $[\eta]$ of the copolymer [A] is 0.5 dl/g or less, and preferably less than 0.3 dl/g is preferable, especially when the rubber composition is subjected to LIM molding. A rubber composition having the intrinsic viscosity $[\eta]$ in the above range is capable of providing crosslinked rubber moldings that are excellent not only in strength properties and compression set resistance but also in processability.

Furthermore, the copolymer [A] according to the present invention preferably has a low viscosity, specifically, a complex viscosity (25° C., strain 1%) as measured with a rheometer MCR-301 manufactured by Anton Paar (Australia) of $10^5$ Pa·sec or less, preferably 4,000 Pa·sec or less, and more preferably 2,000 Pa·sec or less.

Process for Producing Copolymer [A]

The copolymer [A] according to the present invention can be produced by copolymerizing ethylene, an α-olefin, and a non-conjugated polyene such as the above-mentioned norbornene compound represented by formula [I] in the presence of a polymerization catalyst. Specifically, the copolymer [A] can be preferably prepared by hitherto publicly known processes as described in, for example, "Polymer Production Process" (published by Kogyo Chosakai Publishing Inc., pp. 365 to 378), Japanese Unexamined Patent Application Publication No. 9-71617, Japanese Unexamined Patent Application Publication No. 9-71618, Japanese Unexamined Patent Application Publication No. 9-208615, Japanese Unexamined Patent Application Publication No. 10-67823, Japanese Unexamined Patent Application Publication No. 10-67824, and Japanese Unexamined Patent Application Publication No. 10-110054.

The polymerization catalyst preferably used is a Ziegler catalyst containing a transition metal compound such as vanadium (V), zirconium (Zr), or titanium (Ti), and an organoaluminum compound (organoaluminum oxy-compound); and a metallocene catalyst containing a metallocene compound of a transition metal selected from group IVB of the periodic table of elements and either an organoaluminum oxy-compound or an ionizing ionic compound.

Specifically, the copolymer [A] according to the present invention can be desirably produced by copolymerizing ethylene, an α-olefin, and the above-mentioned non-conjugated polyene, particularly preferably a norbornene compound having a vinyl group, in the presence of a catalyst containing a vanadium compound (a) and an organoaluminum compound (b) described below as main components. The conditions of the desirable production is that the polymerization temperature is 30° C. to 60° C., particularly desirably 30° C. to 50° C., the polymerization pressure is 4 to 12 kgf/cm$^2$, particularly desirably 5 to 8 kgf/cm$^2$, and the molar ratio of the amount of non-conjugated polyene fed to the amount of ethylene fed (non-conjugated polyene/ethylene) is 0.01 to 0.2. The copolymerization is preferably conducted in a hydrocarbon medium.

Examples of the vanadium compounds (a) include vanadium compounds represented by general formula $VO(OR)_a X_b$ or $V(OR)_c X_d$ (wherein R is a hydrocarbon group, $0 \leq a \leq 3$, $0 \leq b \leq 3$, $2 \leq a+b \leq 3$, $0 \leq c \leq 4$, $0 \leq d \leq 4$, and $3 \leq c+d \leq 4$), and electron-donor adducts thereof.

More specific examples thereof include $VOCl_3$, $VO(OC_2H_5)Cl_2$, $VO(OC_2H_5)_2Cl$, $VO(O\text{-iso-}C_3H_7)Cl_2$, $VO(O\text{-n-}C_4H_9)Cl_2$, $VO(OC_2H_5)_3$, $VOBr_3$, $VCl_4$, $VOCl_3$, $VO(O\text{-n-}C_4H_9)_3$, and $VCl_3 \cdot 2OC_6H_{12}OH$.

Specific examples of the organoaluminum compounds (b) include trialkylaluminums such as triethylaluminum, tributylaluminum, and triisopropylaluminum; dialkylaluminum alkoxides such as diethylaluminum ethoxide and dibutylaluminum butoxide; alkylaluminum sesquialkoxides such as ethylaluminum sesquiethoxide and butylaluminum sesquibutoxide; partially alkoxylated alkylaluminums having an average composition represented by $R_{0.5}Al(OR)_{0.5}$ or the like; partially halogenated alkylaluminums, such as dialkylaluminum halides, e.g., diethylaluminum chloride, dibutylaluminum chloride, and diethylaluminum bromide, alkylaluminum sesquihalides, e.g., ethylaluminum sesquichloride, butylaluminum sesquichloride, and ethylaluminum sesquibromide, and alkylaluminum dihalides, e.g., ethylaluminum dichloride, propylaluminum dichloride, and butylaluminum dibromide; partially hydrogenated alkylaluminums, such as dialkylaluminum hydrides e.g., diethylaluminum hydride and dibutylaluminum hydride, and alkylaluminum dihydrides, e.g., ethylaluminum dihydride and propylaluminum dihydride; and partially alkoxylated and halogenated alkylaluminums such as ethylaluminum ethoxychloride, butylaluminum butoxychloride, and ethylaluminum ethoxybromide.

Other Resin Components

The resin component contained in the rubber composition according to the present invention is preferably only the above-described ethylene/α-olefin/non-conjugated polyene copolymer [A]. However, the rubber composition may contain resin components other than the ethylene/α-olefin/non-conjugated polyene copolymer [A] within a range that does not impair the objects of the present invention.

As for the resin components other than the copolymer [A], for example, organopolysiloxanes are preferably used as an optional component. Organopolysiloxanes have a function of improving heat aging resistance of the rubber composition and contribute to improve heat aging resistance of fuel cell sealing components, hard disk drive top cover gaskets, and sealing members for electric wire connectors.

When the rubber composition of the present invention contains an organopolysiloxane, the organopolysiloxane is contained in such an amount that the weight ratio of the ethylene/α-olefin/non-conjugated polyene copolymer:organopolysiloxane is preferably 99.9:0.1 to 5:95, more preferably 99.9:0.1 to 60:40, and still more preferably 99.9:0.1 to 70:30.

An example of the organopolysiloxane is an organopolysiloxane having an average composition formula represented by formula (S) below.

$$R^1_t SiO_{(4-t)/2} \quad (S)$$

(In formula (S), $R^1$ represents a monovalent hydrocarbon group having 1 to 10 carbon atoms, some or all of hydrogen atoms of the group may be substituted with cyano groups or halogen atoms, and t is a number of 1.9 to 2.1.)

Specific examples of $R^1$ in formula (S) above include alkyl groups such as a methyl group, an ethyl group, a propyl group, a butyl group, a hexyl group, and an octyl group; cycloalkyl groups such as a cyclopentyl group and a cyclohexyl group; alkenyl groups such as a vinyl group, an allyl group, and a propenyl group; cycloalkenyl groups such as a cyclopentenyl group and a cyclohexenyl group; aryl groups such as a phenyl group, a tolyl group, and a xylyl group; and aralkyl groups such as a benzyl group and a phenylethyl group. Some or all of hydrogen atoms of these groups may be substituted with chlorine atoms, fluorine atoms, or cyano groups.

Particularly preferable organopolysiloxanes include an organopolysiloxane having a dimethylsiloxane unit in the main chain thereof, and an organopolysiloxane in which a diphenylsiloxane unit having phenyl groups, a methylvinylsiloxane unit having a vinyl group, a methyl-3,3,3-trifluoropropylsiloxane unit having a 3,3,3-trifluoropropyl group, or the like is introduced into a part of the main chain of dimethylpolysiloxane.

The organopolysiloxane preferably has two or more aliphatic unsaturated groups such as alkenyl groups or cycloalkenyl groups in one molecule, and the amount of aliphatic unsaturated groups, in particular, vinyl groups, in $R^1$ is preferably 0.01% to 20% by mole, and particularly preferably 0.02% to 10% by mole. The aliphatic unsaturated group may be present at an end of the molecular chain, at a halfway position of the molecular chain, or both of them. In addition, the aliphatic unsaturated group is preferably present at least at an end of the molecular chain. The end of the molecular chain may be blocked with a trimethylsilyl group, a dimethylphenylsilyl group, a dimethylhydroxysilyl group, a dimethylvinylsilyl group, a trivinylsilyl group, or the like.

Examples of particularly preferable organopolysiloxanes usable in the present invention include methylvinylpolysiloxane, methylphenylvinylpolysiloxane, and methyltrifluoropropylvinylpolysiloxane.

Such an organopolysiloxane can be obtained by, for example, (co)hydrolysis/condensation of one or two or more kinds of organohalogenosilanes or ring-opening-polymerization of a cyclic polysiloxane (e.g., trimer or tetramer of siloxane) using an alkaline or acid catalyst. The resulting organopolysiloxane is basically a straight-chain diorganopolysiloxane, and may be a mixture of two kinds or three or more kinds of organopolysiloxanes having different molecular structures.

The organopolysiloxane is available as a commercial product or can be synthesized by a disclosed and publicly known method.

The degree of polymerization of the organopolysiloxane is preferably 100 or more, and particularly preferably 3,000 to 20,000. The viscosity thereof at 25° C. is preferably 100 centistokes (cSt) or more, and particularly preferably 100,000 to 100,000,000 cSt.

The rubber composition of the present invention may contain other publicly known rubbers in combination as other resin components within a range that does not impair the objects of the present invention. Specific examples thereof include natural rubber (NR), isoprene-based rubbers such as isoprene rubber (IR), and conjugated diene-based rubbers such as butadiene rubber (BR), styrene-butadiene rubber (SBR), acrylonitrile-butadiene rubber (NBR), and chloroprene rubber (CR). Furthermore, hitherto publicly known ethylene/α-olefin copolymer rubbers such as ethylene/propylene random copolymer (EPR), and ethylene/α-olefin/non-conjugated polyene copolymers other than the copolymer [A] of the present invention may also be used.

[B] Carbon Black

Carbon black [B] used in the present invention has an amount of iodine adsorption of 80 mg/g or less, preferably 15 to 40 mg/g, an average particle diameter of 250 nm or less, preferably 40 to 100 nm, and an amount of DBP absorption of 10 to 300 cm³/100 g, preferably 40 to 150 cm³/100 g. Commercially available carbon black such as FEF grade, GPF grade, and SRF grade may be used as such carbon black. The carbon black [B] functions as a reinforcing agent in the rubber composition.

Here, the amount of iodine adsorption and the amount of DBP absorption are typical indicators representing properties of carbon black and are measured in accordance with JIS K6217. The amount of iodine adsorption is an indicator of the total surface area of the carbon black including pores thereof. The amount of DBP absorption correlates with the structure. Regarding the amounts of iodine adsorption and DBP absorption, the magnitudes of these characteristic values significantly affect the reinforcing property, extrusion properties, dispersibility, coloring power, viscosity, and electrical conductivity when the carbon black is blended in the rubber composition.

The particle diameter represents an average diameter measured and calculated with an electron microscope image of small spherical components forming carbon black aggregated pairs, and closely relates to the reinforcing property and the degree of black when the carbon black is blended in the rubber composition.

Accordingly, when carbon black used has any one of the amount of iodine adsorption, the average particle diameter, and the amount of DBP absorption thereof outside of the above conditions, a sufficient reinforcing property is often not exhibited, or even if a reinforcing property is exhibited, the viscosity of the material of the rubber composition may become too high, which may result in degradation of moldability in LIM molding.

The amount of carbon black [B] blended is preferably 1 to 40 parts by weight, and more preferably 5 to 30 parts by weight relative to 100 parts by weight of the resin component contained in the rubber composition.

[C] Surface-Modified Silica

The surface-modified silica [C] used in the present invention is obtained by subjecting precipitated silica (hydrous silicic acid) to surface modification and has a BET specific surface area of 30 to 80 m$^2$/g, preferably 40 to 60 m$^2$/g, a particle diameter of 1.0 to 4.0 μm, preferably 1.5 to 3.0 μm as measured by the Coulter counter method, and an M value of 50 or more. Here, the BET specific surface area represents a primary particle diameter, and the particle diameter is an indicator of a second particle diameter.

A raw material for the surface-modified silica [C] used in the present invention is precipitated silica (hydrous silicic acid). In addition to precipitated silica, gel-method silica, dry-process silica (anhydrous silicic acid), colloidal silica, and the like are generally known as silica. Gel-method silica has a strong cohesive strength and secondary (aggregated) particles thereof are hard and difficult to be separated from each other. Accordingly, gel-method silica has poor dispersibility and usually has a large BET specific surface area of 250 to 900 m$^2$/g. Consequently, the viscosity of the resulting rubber composition tends to increase, resulting in a problem of poor processability. Colloidal silica generally has a large primary particle diameter and a small BET specific surface area, and therefore, has good processability. However, colloidal silica particles themselves are monodispersed, and thus there is a problem that an effect of imparting the resulting rubber composition with a reinforcing property is not expected. Secondary (aggregated) particles of dry-process silica easily become loose, but dry-process silica has poor dispersibility in rubber and usually has a relatively large BET specific surface area of about 100 to 400 m$^2$/g, thus resulting in a problem of insufficient processability. For these reasons, precipitated silica is the most preferable as the raw material for the surface-modified silica [C] used in the invention.

Examples of the surface modification treatment of precipitated silica include surface treatments with hexamethyldisilazane, chlorosilane, alkoxysilane, dimethyldichlorosilane, octylsilane, dimethyl silicone oil, or the like. These surface treatments can provide an effect of suppressing an increase in the viscosity of the rubber composition when the surface-modified silica [C] is added thereto.

Furthermore, the surface-modified silica [C] used in the present invention may be subjected to, in addition to the surface treatment described above, a mechanical treatment such as shear fracture in order to reduce the steric hindrance of the silica surface due to the surface treatment.

The degree of surface modification treatment of silica is represented by an M. value, and the surface-modified silica [C] used in the present invention preferably has an M value of 50 or more. Note that the M value is a typical indicator representing the degree of surface modification treatment of silica and is a value represented by the concentration of an aqueous methanol solution (vol % of methanol) when aqueous methanol solutions having different methanol concentrations are added to silica of a measurement target and the silica begins to have affinity (begins to become wet).

The amount of surface-modified silica [C] added is preferably 20 to 60 parts by weight relative to 100 parts by weight of the resin components contained in the rubber composition.

In the present invention, the surface-modified silica [C] functions as a reinforcing agent of the rubber composition together with the carbon black [B]. If the amount of these components added is too small, desired reinforcing properties cannot be obtained. If the amount is too large, the viscosity of the rubber composition is too high, and moldability thereof may be impaired.

In the present invention, use of the carbon black [B] and the surface-modified silica [C] in combination as reinforcing agents achieves a good balance between the reinforcing property and moldability of the rubber composition. When only the carbon black [B] is used as the reinforcing agent of the rubber composition, the dispersibility of the carbon black during kneading may be insufficient, or tackiness (adherence) may be generated in crosslinked products, thereby degrading the handleability of the rubber material. On the other hand, when only the surface-modified silica [C] is blended until a reinforcing property is obtained, the viscosity of the resulting rubber composition may decrease, thereby significantly degrading the processability, and LIM molding may be difficult to be performed.

[D] Crosslinking Agent

The rubber composition of the present invention preferably contains a crosslinking agent [D] in addition to the copolymer [A], the carbon black [B], and the surface-modified silica [C] described above. Any publicly known crosslinking agent may be adequately used as the crosslinking agent [D]. Among those, a crosslinking agent that exhibits compatibility or good dispersibility with the copolymer [A] is preferably used. In particular, when the non-conjugated polyene component of the copolymer [A] is the above-mentioned norbornene compound represented by general formula [I], a compound having a crosslinking point SiH group is more preferably used.

Examples of such SiH group-containing compounds that are preferably used as the crosslinking agent [D] include SiH group-containing compounds (1) having two SiH groups in one molecule and represented by general formula [II] below and SiH group-containing compounds (2) having three SiH groups in one molecule and represented by general formula [III] below.

[Chem. 5]

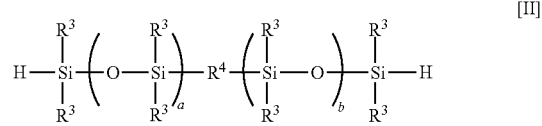

[II]

(In formula [II], R$^3$s are each a monovalent group having 1 to 10 carbon atoms and are each an unsubstituted or substituted saturated hydrocarbon group or an aromatic hydrocarbon group, $R^3$s may be the same or different in one molecule, a is an integer of 0 to 20, b is an integer of 0 to 20, and $R^4$ is a divalent organic group having 1 to 30 carbon atoms or an oxygen atom.)

[Chem. 6]

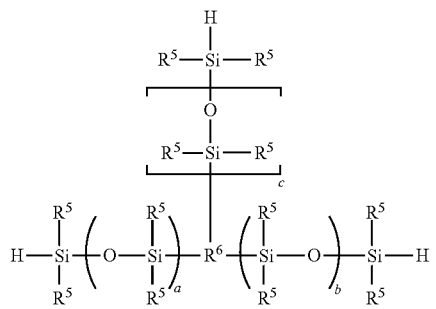

[III]

(In formula [III], $R^5$s are each a monovalent group having 1 to 10 carbon atoms and are each an unsubstituted or substituted saturated hydrocarbon group or an aromatic hydrocarbon group, $R^5$s may be the same or different in one molecule, a, b, and c are each independently an integer of 0 to 20, and $R^6$ is a trivalent organic group having 1 to 30 carbon atoms.)

The SiH group-containing compound (1) having two SiH groups in one molecule and represented by general formula [II] has SiH groups at both ends of a molecule and has two SiH groups per molecule. Specific examples of $R^3$ in general formula [II] include a methyl group, an ethyl group, a propyl group, an isopropyl group, a butyl group, an amyl group, a cyclopentyl group, a hexyl group, a cyclohexyl group, an octyl group, a chloromethyl group, a 2-chloroethyl group, a 3-chloropropyl group, a phenyl group, a phenylmethyl group, a 2-phenylethyl group, and a 2-phenylpropyl group. Preferably, $R^3$ is a methyl group, an ethyl group, or a phenyl group a is an integer of 0 to 20, and b is an integer of 0 to 20. Preferably, a and b are each preferably 10 or less, more preferably 5 or less, and particularly preferably 2 or less. Most preferably, a and b are equal to each other and are each 2 or less.

Specific examples of the SiH group-containing compounds (1) having two SiH groups in one molecule and represented by general formula [II] are shown below. $R^4$ in general formula [II] is a divalent organic group of 1 to 30 carbon atoms or an oxygen atom. Specific examples of the divalent organic group correspond to divalent groups in specific examples of the compounds shown below. These SiH group-containing compounds (1) can be used alone or by mixing two or more kinds of the compounds. The SiH group-containing compound (1) may be synthesized by a disclosed and publicly known method.

[Chem. 7]

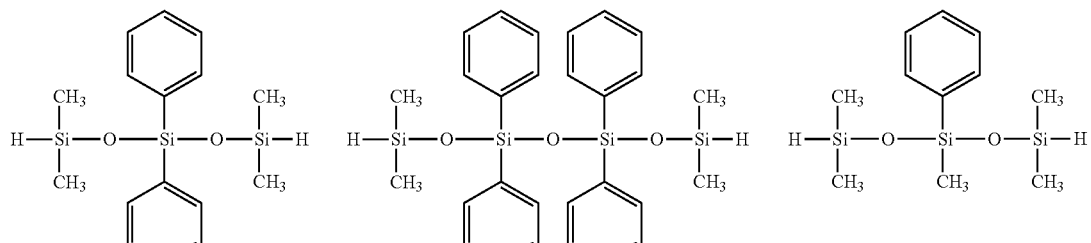

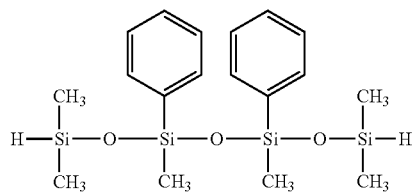

[Chem. 8]

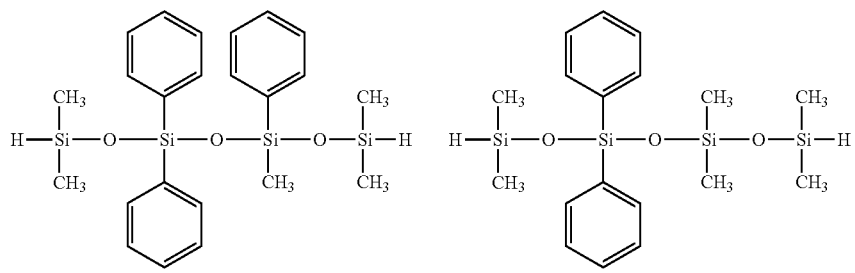

-continued
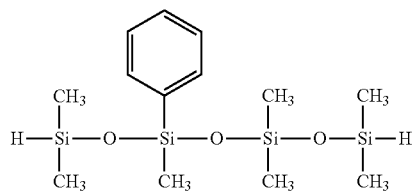 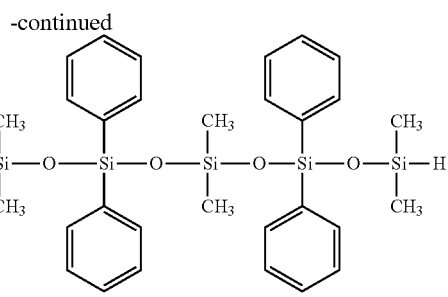
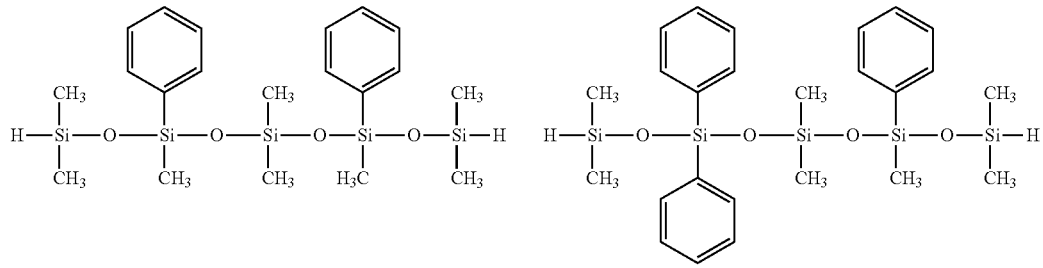
[Chem. 9]
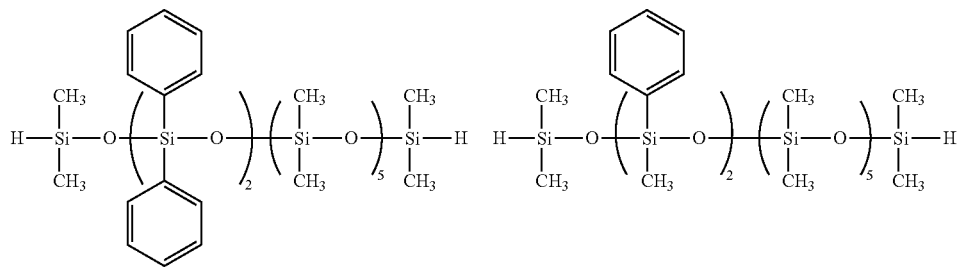
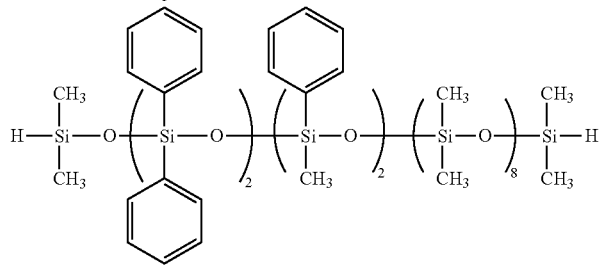
[Chem. 10]
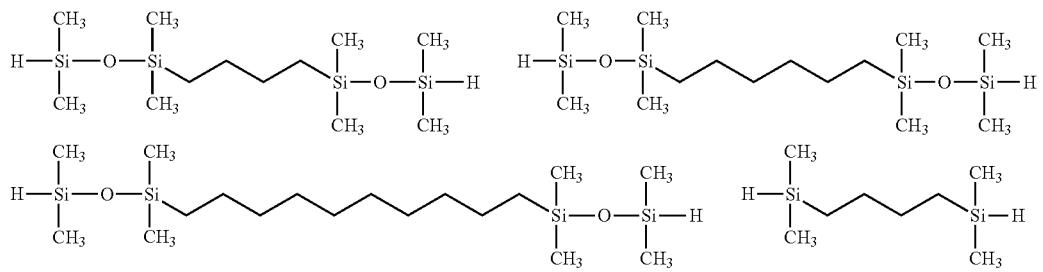
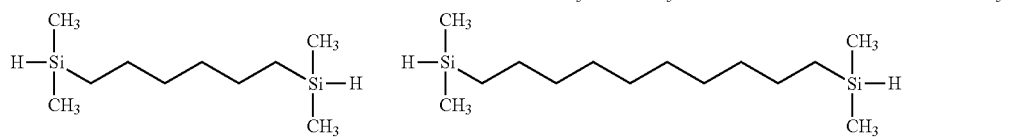
[Chem. 11]
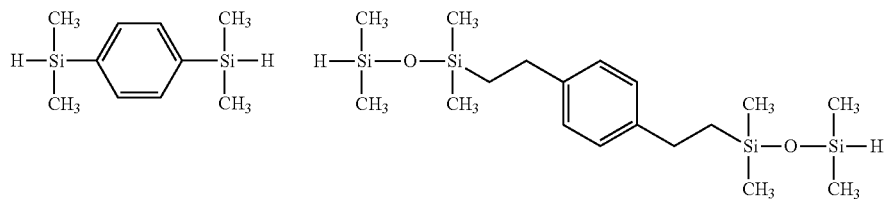

-continued
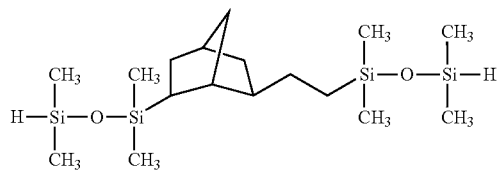
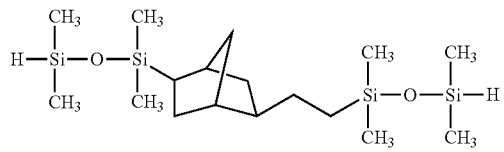
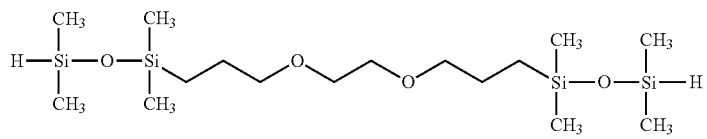
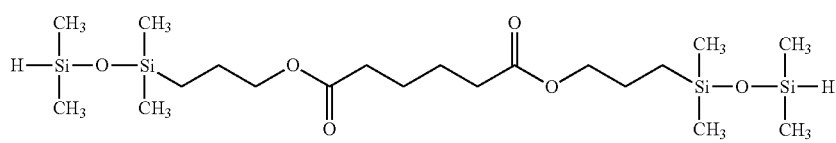
[Chem. 12]
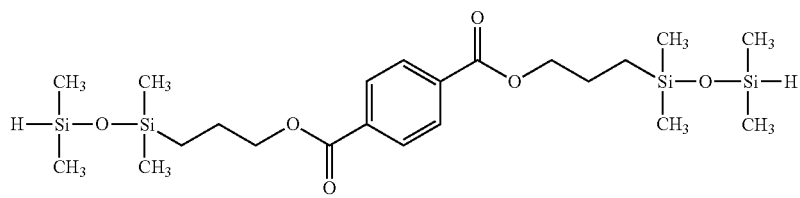
[Chem. 13]
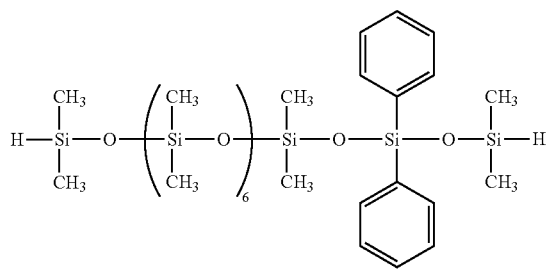
[Chem. 14]
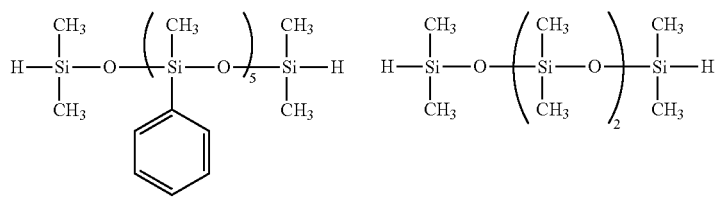

Among these, an SiH group-containing compound (1) that has two SiH groups in one molecule and that is particularly preferably used in the present invention is a compound represented by the following formula.

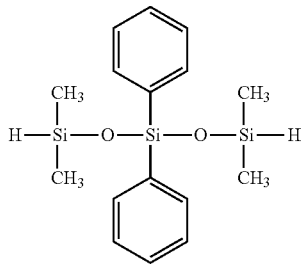
[Chem. 15]

The SiH group-containing compound (2) having three SiH groups in one molecule and represented by general formula [III] has SiH groups at three ends of the molecule and has three SiH groups in one molecule. Examples of $R^5$ in general formula [III] include the same as $R^3$ in general formula [II]. Specific examples of $R^5$ include a methyl group, an ethyl group, a propyl group, an isopropyl group, a butyl group, an amyl group, a cyclopentyl group, a hexyl group, a cyclohexyl group, an octyl group, a chloromethyl group, a 2-chloroethyl group, a 3-chloropropyl group, a phenyl group, a phenylmethyl group, a 2-phenylethyl group, and a 2-phenylpropyl group. Preferably, $R^5$ is a methyl group, an ethyl group, or a phenyl group a, b, and c are each independently an integer of 0 to 20. a, b, and c are each preferably 10 or less, more preferably 5 or less, and particularly preferably 2 or less. Most preferably, a, b, and c are equal to each other and are each 2 or less. $R^6$ in general formula [III] is a trivalent organic group of 1 to 30 carbon atoms, and preferably a silicon-containing trivalent organic group of 1 to 30 carbon atoms.

Particularly preferable SiH group-containing compounds (2) having three SiH groups in one molecule include a compound represented by the following formula.

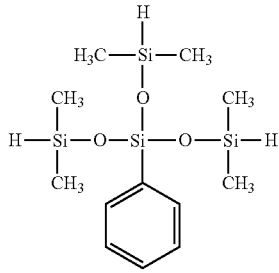
[Chem. 16]

The crosslinking agent [D] according to the present invention contains preferably the SiH group-containing compound (1) or the SiH group-containing compound (2), more preferably at least the SiH group-containing compound (1), and particularly preferably the SiH group-containing compound (1) and the SiH group-containing compound (2).

When the crosslinking agent [D] contains the SiH group-containing compound (1) without the SiH group-containing compound (2), the crosslinking density of the obtainable rubber composition can be controlled to some degree, and moldings made of the rubber composition are excellent in terms of elongation properties. However, there is room for improvement in elastic recovery ratio (TR recovery ratio) at a low temperature (−30° C.)

When the crosslinking agent [D] contains the SiH group-containing compound(2) without the SiH group-containing compound (1), the rubber composition is three-dimensionally crosslinked, and rubber physical properties such as a mechanical strength are thereby improved. However, the rubber composition may have a poor recovery property, tends to cause scorching, and thus may have poor handleability during molding. Thus, there is room for improvement in that the rubber composition may exhibit properties that are not suitable for use in a fuel cell sealing member, a gasket member for LIM molding, a sealing member for an electric wire connector, and the like.

When the crosslinking agent [D] contains both the SiH group-containing compound (1) and the SiH group-containing compound (2), the rubber composition has not only an good moldability, an excellent heat resistance, an excellent barrier property, and an excellent sealing property, but also a low compression set ratio at a high temperature (150° C.), and an excellent elastic recovery ratio (TR recovery ratio) at a low temperature (−30° C.). Thus the rubber composition can be suitably used in applications such as a fuel cell sealing member, a gasket member for LIM molding, or a sealing member for an electric wire connector.

When the crosslinking agent [D] contains the SiH group-containing compound (1), the rubber composition of the present invention desirably contains the SiH group-containing compound (1) having two SiH groups in one molecule in an amount of preferably 3.0 to 7.0 parts by weight, and more preferably 4.0 to 6.5 parts by weight relative to 100 parts by weight of the total amount of the ethylene/α-olefin/non-conjugated polyene copolymer [A] and other resin components contained in the rubber composition.

When the crosslinking agent [D] contains the SiH group-containing compound (2) having three SiH groups in one molecule, the rubber composition of the present invention desirably contains the SiH group-containing compound (2) having three SiH groups in one molecule in an amount of preferably 0.1 to 2.0 parts by weight, and more preferably 0.2 to 1.0 part by weight relative to 100 parts by weight of the total amount of the ethylene/α-olefin/non-conjugated polyene copolymer [A] and other resin components contained in the rubber composition.

In particularly preferable embodiments of the present invention, the crosslinking agent [D] contains the SiH group-containing compound (1) having two SiH groups in one molecule and the SiH group-containing compound (2) having three SiH groups in one molecule, and the rubber composition contains the SiH group-containing compound (1) in an amount of preferably 3.0 to 7.0 parts by weight, and more preferably 4.0 to 6.5 parts by weight and the SiH group-containing compound (2) in an amount of preferably 0.1 to 2.0 parts by weight, and more preferably 0.2 to 1.0 part by weight relative to 100 parts by weight of the total amount of the ethylene/α-olefin/non-conjugated polyene copolymer [A] and other resin components contained in the rubber composition.

Rubber Composition

The rubber composition of the present invention contains resin components containing the ethylene/α-olefin/non-conjugated polyene copolymer [A] as an essential component, the carbon black [B], and the surface-modified silica [C], and, according to need, the crosslinking agent [D], and further according to need, other components such as a catalyst, reaction inhibitor, publicly known inorganic filler, softener, anti-aging agent, processing aid, vulcanization accelerator, organic peroxide, crosslinking aid, foaming agent, colorant, dispersant, and flame retardant described below.

Preparation of Rubber Composition

The rubber composition of the present invention may be prepared by, for example, as follows. The copolymer [A] and, if necessary, other resin components are kneaded together with a rubber reinforcing agent containing carbon black [B] and the surface-modified silica [C], and optional other components, such as an inorganic filler and a softener at a temperature of preferably 50° C. to 180° C. for 3 to 10 minutes using an internal mixer (closed mixing machine) such as a Banbury mixer, a kneader, a planetary mixer, or an intermix, or a kneading machine such as a two-roll mill or a three-roll mill. Subsequently, the crosslinking agent [D], for example the SiH group-containing compound, and if necessary, a catalyst, a reaction inhibitor, a vulcanization accelerator, and a crosslinking aid described below are added and kneaded using a roll such as an open roll, or a kneader at a roll temperature of 100° C. or lower for 1 to 30 minutes. The resulting mixture is then sheeting out.

When the kneading is performed at low temperature using an internal mixer, all components for the rubber composition may be simultaneously mixed and kneaded.

Crosslinking Method

Catalyst

In the case where crosslinking is conducted using the crosslinking agent [D], for example the SiH group-containing compound, in producing the rubber composition of the present invention, a catalyst used for the crosslinking is an addition reaction catalyst and accelerates addition reaction (e.g., hydrosilylation reaction of an alkene) of an alkenyl group or the like of the resin component containing the copolymer [A] with an SiH group of the SiH group-containing compound.

As such a catalyst, an addition reaction catalyst comprising a platinum group element, such as a platinum-based catalyst, a palladium-based catalyst, or a rhodium-based catalyst is usually used, and a platinum-based catalyst is preferably used. It is desirable to use a complex comprising a group 8 element metal in the periodic table such as platinum-based catalysts, particularly preferably a complex obtained from platinum and a compound containing a vinyl group and/or a carbonyl group.

The carbonyl group-containing compound is preferably a carbonyl compound, an octanal compound, or the like. Specific examples of the complexes of such compounds and platinum include a platinum-carbonyl complex, a platinum-octanal complex, a platinum-carbonylbutylcyclosiloxane complex, and a platinum-carbonylphenylcyclosiloxane complex.

The vinyl group-containing compound is preferably a vinyl group-containing organosiloxane. Specific examples of the complexes of such compounds and platinum include a platinum-divinyltetramethyldisiloxane complex, a platinum-divinyltetraethyldisiloxane complex, a platinum-divinyltetrapropyldisiloxane complex, a platinum-divinyltetrabutyldisiloxane complex, and a platinum-divinyltetraphenyldisiloxane complex.

Among the vinyl group-containing organosiloxanes, a vinyl group-containing cyclic organosiloxane is preferable. Examples of the complexes of such compounds and platinum include a platinum-vinylmethylcyclosiloxane complex, a platinum-vinylethylcyclosiloxane complex, and a platinum-vinylpropylcyclosiloxane complex.

The vinyl group-containing organosiloxane itself may be used as a ligand to a metal. In addition, it may be used as a solvent for coordinating other ligands. A complex with a ligand derived from the above-mentioned carbonyl group-containing compound, which complex is obtained in the presence of the vinyl group-containing organosiloxane as a solvent, is particularly preferable as a catalyst.

Specific examples of such complexes include a vinylmethylcyclosiloxane solution of a platinum-carbonyl complex, a vinylethylcyclosiloxane solution of a platinum-carbonyl complex, a vinylpropylcyclosiloxane solution of a platinum-carbonyl complex, a divinyltetramethyldisiloxane solution of a platinum-carbonyl complex, a divinyltetraethyldisiloxane solution of a platinum-carbonyl complex, a divinyltetrapropyldisiloxane solution of a platinum-carbonyl complex, a divinyltetrabutyldisiloxane solution of a platinum-carbonyl complex, and a divinyltetraphenyldisiloxane solution of a platinum-carbonyl complex.

The catalysts comprising these complexes may further contain components other than the compound containing a vinyl group and/or a carbonyl group. For example, the catalysts may contain a solvent other than the compound containing a vinyl group and/or a carbonyl group. Examples of such solvents include, but are not limited to, various alcohols and xylene.

Specific examples of the alcohols include aliphatic saturated alcohols such as methanol and ethanol; aliphatic unsaturated alcohols such as allyl alcohol and crotyl alcohol; alicyclic alcohols such as cyclopentanol and cyclohexanol; aromatic alcohols such as benzyl alcohol and cinnamyl alcohol; and heterocyclic alcohols such as furfuryl alcohol.

An example of the catalyst using an alcohol as a solvent is a platinum-octanal/octanol complex. The catalyst containing such a solvent has advantages in that, for example, handling of the catalyst and mixing of the catalystwith the rubber composition are facilitated.

Among above-mentioned various catalysts, preferable are a vinylmethylcyclosiloxane solution of a platinum-carbonyl complex (in particular, a complex represented by chemical formula 1 below is preferable), a platinum-vinylmethylcyclosiloxane complex (in particular, a complex represented by chemical formula 2 is preferable), a platinum-divinyltetramethyldisiloxane complex (in particular, a complex represented by chemical formula 3 is preferable), a platinum-octanal/octanol complex etc., from the standpoint of practical use. Among these, a platinum-carbonylvinylmethylcyclosiloxane complex is particularly preferable.

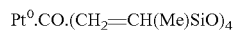

$Pt^0 \cdot CO \cdot (CH_2=CH(Me)SiO)_4$            Chemical formula 1:

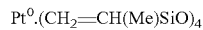

$Pt^0 \cdot (CH_2=CH(Me)SiO)_4$            Chemical formula 2:

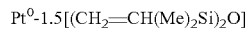

$Pt^0 \cdot 1.5[(CH_2=CH(Me)_2Si)_2O]$            Chemical formula 3:

The proportion of the group 8 element metal (preferably platinum) in the periodic table contained in these catalysts is usually 0.1% to 10% by weight, preferably 0.1% to 5% by weight, more preferably 0.1% to 4% by weight, and particularly preferably 0.1% to 3.5% by weight.

The catalyst is used in a proportion of 0.1 to 100,000 ppm by weight, preferably 0.1 to 10,000 ppm by weight, more preferably 0.1 to 5,000 ppm by weight, and particularly preferably 0.1 to 1,000 ppm by weight relative to the total of the resin components, that is, the total of the copolymer [A] and other resin components added as required. However, the proportion is not particularly limited thereto. When the catalyst is used in a proportion within the above range, a rubber composition is obtained with capability of forming crosslinked rubber moldings having a moderate crosslinking density, excellent strength properties and excellent elongation properties. Use of the catalyst in a proportion exceeding 100,000 ppm by weight is not preferable because of disadvantage in terms of the cost. A crosslinked rubber molding can also be obtained by irradiating an uncrosslinked rubber molding of a rubber composition containing no catalyst with light, γ-rays, electron beams, or the like.

In the crosslinking of the rubber composition of the present invention, both addition crosslinking and radical crosslinking may be conducted by using an organic peroxide in addition to the above catalyst. The organic peroxide is used in a proportion of about 0.1 to 10 parts by weight relative to 100 parts by weight of the resin components. A hitherto publicly known organic peroxide that is usually used for crosslinking of rubbers may be used as the organic peroxide.

Reaction Inhibitor

In the crosslinking, a reaction inhibitor is preferably used together with the above catalyst. Examples of the reaction inhibitors include benzotriazole; ethynyl group-containing alcohols such as ethynylcyclohexanol; acrylonitrile; amide compounds such as N,N-diallylacetamide, N,N-diallylbenzamide, N,N,N',N'-tetraallyl-o-phthalic acid diamide, N,N,N',N'-tetraallyl-m-phthalic acid diamide and N,N,N',N'-tetraallyl-p-phthalic acid diamide; sulfur; phosphorus; nitrogen; amine compounds; sulfur compounds; phosphorus compounds; tin; tin compounds; tetramethyl tetravinyl cyclotetrasiloxane; and organic peroxides such as hydroperoxides.

The reaction inhibitor is used in a proportion of 0 to 50 parts by weight, usually 0.0001 to 50 parts by weight, preferably 0.0001 to 30 parts by weight, more preferably 0.0001 to 20 parts by weight, still more preferably 0.0001 to 10 parts by weight, and particularly preferably 0.0001 to 5 parts by weight relative to 100 parts by weight of the total of the copolymer [A] and, as required, other resin components. Use of the reaction inhibitor in a proportion exceeding 50 parts by weight is not preferable because of disadvantage in terms of the cost.

The rubber composition of the present invention may be blended with hitherto publicly known additives such as a rubber reinforcing agent other than the carbon black [B] or the surface-modified silica [C], an inorganic filler, a softener, an anti-aging agent, a processing aid, a vulcanization accelerator, an organic peroxide, a crosslinking aid, a foaming agent, a foaming aid, a colorant, a dispersant, and a flame retardant, according to the intended application or the like of the crosslinked product within a range that does not impair the objects of the present invention. These additives will be specifically described below by taking representative examples as a filler and compounding ingredients.

(i) Rubber Reinforcing Agent

The rubber reinforcing agent has an effect of enhancing mechanical properties of a crosslinked (vulcanized) rubber, such as tensile strength, tear strength, and abrasion resistance. The rubber composition of the present invention contains the carbon black [B] and the surface-modified silica [C], and thus exerts a sufficient reinforcing effect without incorporating other rubber reinforcing agents. However, other rubber reinforcing agents may be incorporated and specific examples thereof include carbon black other than the above carbon black [B], silica other than the above surface-modified silica [C], and finely divided silicic acid.

The kind and the amount of rubber reinforcing agent added may be adequately selected according to the intended use thereof. However, the amount of rubber reinforcing agent added (including the amounts of component [B] and component [C]) is usually up to 300 parts by weight, and preferably up to 200 parts by weight relative to 100 parts by weight of the total of the ethylene/α-olefin/non-conjugated polyene copolymer [A] and other resin components added as required.

(ii) Inorganic Filler

Specific examples of the inorganic fillers include light calcium carbonate, heavy calcium carbonate, talc, clay, and diatomaceous earth. These inorganic fillers may be used alone or in combination of two or more kinds thereof. The kind and the amount of inorganic filler added may be adequately selected according to the intended use thereof. However, the amount of inorganic filler added is usually 1 part by weight to up to 300 parts by weight, and preferably up to 200 parts by weight relative to 100 parts by weight of the total of the copolymer [A] and other resin components added as required.

(iii) Softener

A publicly known softener that is usually used for rubbers may be used as the softener in the present invention. Specific examples of the softeners include petroleum softeners such as process oil, lubricant, paraffin, liquid paraffin, petroleum asphalt, and vaseline; coal tar softeners such as coal tar and coal tar pitch; fatty oil softeners such as castor oil, linseed oil, rapeseed oil, and coconut oil; waxes such as beeswax, carnauba wax, and lanolin; fatty acids and fatty acid salts such as ricinolic acid, palmitic acid, barium stearate, calcium stearate, and zinc laurate; synthetic polymers such as petroleum resins, atactic polypropylene, and coumarone-indene resins; and other softeners such as tall oil and factice. Among these, petroleum softeners are preferably used, and process oil is particularly preferably used. The amount of softener added is adequately selected according to the intended use of the crosslinked product. These softeners may be used alone or in combination of two or more kinds thereof.

(iv) Anti-Aging Agent

In the present invention, an anti-aging agent may be used in order to improve heat resistance. Any hitherto publicly known anti-aging agent may be used as the anti-aging agent in the present invention without particular limitation, and examples thereof include amine anti-aging agents, hindered phenol anti-aging agents, and sulfur anti-aging agents. The anti-aging agent is used in an amount within a range that does not impair the objects of the present invention. The anti-aging agents described as examples below may be used alone or in combination of two or more kinds thereof even in the same kind or different kinds of the amine anti-aging agents, the hindered phenol anti-aging agents, and the sulfur anti-aging agents.

Examples of the amine anti-aging agents include diphenylamines and phenylenediamines. In particular, 4,4'-(α,α-dimethylbenzyl)diphenylamine and N,N'-di-2-naphthyl-p-phenylenediamine are preferable.

As the hindered phenol anti-aging agents, phenolic compounds such as tetrakis[methylene-3-(3,5'-di-t-butyl-4'-hydroxyphenyl)propionate]methane and 3,9-bis[2-{3-(3-t-butyl-4-hydroxy-5-methylphenyl)propionyloxy}-1,1-dimethylethyl]-2,4,8,10-tetraoxaspiro[5,5]undecane are particularly preferable.

As the sulfur anti-aging agents, 2-mercaptobenzimidazole, zinc salt of 2-mercaptobenzimidazole, 2-mercaptomethylbenzimidazole, zinc salt of 2-mercaptomethylbenzimidazole, and pentaerythritol-tetrakis-(β-laurylthiopropionate) are particularly preferable.

(v) Processing Aid

A publicly known compound that is usually used for processing rubbers may be used as the processing aid in the present invention. Specific examples thereof include higher fatty acids such as ricinolic acid, stearic acid, palmitic acid, and lauric acid; salts of higher fatty acids such as barium stearate, zinc stearate, and calcium stearate; and esters of higher fatty acids such as ricinolic acid, stearic acid, palmitic acid, and lauric acid. The processing aid is used in a proportion of 10 parts by weight or less, and preferably 5 parts by weight or less relative to 100 parts by weight of the total of the copolymer [A] and other resin components added as required, but it is desirable to adequately determine the optimum amount according to the physical property values required.

(vi) Crosslinking Aid

In the case where an organic peroxide is used in the crosslinking of the rubber composition of the present invention, a crosslinking aid is preferably used in combination. Specific examples of the crosslinking aids include sulfur, quinone dioxime compounds such as p-quinone dioxime; methacrylate compounds such as polyethylene glycol dimethacrylate; allyl compounds such as diallyl phthalate and triallyl cyanurate; maleimide compounds; and divinylbenzene. Such a crosslinking aid is used in an amount of 0.5 to 2 moles, preferably about equimolar amount relative to 1 mole of the organic peroxide used.

<Fuel Cell Sealing Member, Hard Disk Drive Top Cover Gasket, and Electric Wire Connector Sealing Member>

Molding and Crosslinking Method

The above-described rubber composition of the present invention is excellent not only in mechanical properties but also in heat resistance, and thus it can be particularly suitably used for applications such as a fuel cell sealing member, a hard disk drive top cover gasket, and an electric wire connector sealing member. The rubber composition of the present invention is particularly suitable for LIM molding, but moldings of the rubber composition may also be produced by other molding methods.

The fuel cell sealing member, the hard disk drive top cover gasket, and the sealing member for electric wire connector of the present invention (hereinafter referred to as the "respective members of the present invention") can most prominently exhibit their properties when they are used as crosslinked rubber moldings.

In producing crosslinked rubber moldings from the rubber composition of the present invention, preferably, an uncrosslinked rubber composition is first prepared by the preparation method as described above, the rubber composition is then molded into intended shapes, and the resulting moldings are crosslinked as in the case where ordinary rubbers are usually vulcanized (crosslinked).

The composition of the present invention prepared as described above is molded into intended shapes by various molding methods using an LIM molding machine, an injection molding machine, a transfer molding machine, a press molding machine, an extrusion molding machine, a calender roll, an ink jet forming machine, a screen printing machine, and the like. Among these, the LIM molding machine is preferable for producing the intended respective members of the present invention from the viewpoint of thickness accuracy and high-speed molding. Furthermore, injection molding and compression molding are also preferable.

Crosslinking may be conducted simultaneously with molding the composition, or may be conducted by introducing the resulting molding into a vulcanizing bath.

An example of the crosslinking is as follows. The rubber composition of the present invention is mixed using a kneading machine such as a three-mill roll, an open roll, a two-open roll, a Banbury mixer, an internal mixer, a kneader, a planetary mixer, or a high-shear mixer. The resulting mixture is molded under the crosslinking condition of 80° C. to 230° C., preferably 100° C. to 180° C. As required, the crosslinked molding is then subjected to a heat treatment (secondary vulcanization) in an air oven such as a Geer oven or a thermostatic chamber at about 100° C. to 230° C., preferably about 120° C. to 150° C. for about 0.5 to 24 hours. The molding and crosslinking may thus be conducted. Alternatively, the crosslinking or the secondary crosslinking (secondary vulcanization) may be conducted by irradiating the moldings with light, γ-rays, electron beams, or the like, and crosslinking may be conducted at room temperature. Crosslinked rubber moldings, i.e., the respective members of the present invention, are obtained by the above method.

In this crosslinking stage, the crosslinking may be conducted with or without using a mold. In the case where a mold is not used, in general, the steps of molding and crosslinking are continuously performed. Usable heating means in the vulcanizing bath include a heating bath using hot air, glass-bead fluidized bed, ultra-high frequency electromagnetic waves (UHF), steam, and the like.

LIM Molding

In the case where the rubber composition of the present invention is applied particularly to LIM molding, preferably, preparation of a composition containing a crosslinking agent and a resin component containing the copolymer [A] and that of a composition containing a catalyst and a resin component containing the copolymer [A] are conducted, and these two compositions are then mixed in an LIM molding machine to prepare the rubber composition of the present invention and mold the composition. In this case, components other than the resin components, the crosslinking agent, and the catalyst may be contained in any one of the compositions or both the compositions.

Although the conditions are different depending on the viscosity of the materials or the like, specific example is as follows. The copolymer [A], other resin components, and additives such as a rubber reinforcing agent containing components [B] and [C], a crosslinking agent, an inorganic filler, and a softener are kneaded for 3 to 10 minutes using an internal mixer (closed mixing machine) such as a Banbury mixer, a kneader, or an intermix or a stirring machine such as a planetary mixer to prepare a liquid rubber composition (1). Separately, the copolymer [A], other resin components, additives such as a rubber reinforcing agent, an inorganic filler, and a softener, the catalyst, and if necessary, a reaction inhibitor are kneaded for 3 to 10 minutes to prepare a liquid rubber composition (2). Defoaming is conducted according to need. Subsequently, the liquid rubber composition (1) and the liquid rubber composition (2) are placed in a dedicated pail can that can be directly connected to an LIM molding apparatus or a cartridge that can be directly connected to a LIM molding apparatus, the compositions pass through a metering unit and a mixing unit, and the resulting mixture is subjected to LIM molding, whereby the respective members of the present invention can thus be obtained.

Fuel Cell Sealing Member

For fuel cells, sealing a cell is important, and it is necessary that the seal be excellent particularly in gas barrier properties and the like. An example of the shape of the seal will be described with reference to the drawings.

The sealing member has, for example, a shape indicated by reference numeral 3 in FIGS. 1 and 2. The sealing member has a planar outer shape indicated by reference numeral 3 in FIG. 1. Reference numeral 1 in FIGS. 1 and 2 indicates a carbon, metal, or resin separator, and reference numeral 3 indicates a sealing member. Reference numeral 2 in FIG. 1 indicates a space.

The fuel cell sealing member of the present invention preferably has no voids due to foaming or the like, that is, the fuel cell sealing member is preferably so-called void-free.

The fuel cell sealing member of the present invention desirably has a volume resistivity of $1 \times 10^{10}$ Ω·cm or more. The volume resistivity is one of properties required for sealing members used in electrical or electronic components, and is an indicator of electrical insulation properties. The volume resistivity is more preferably $1 \times 10^{12}$ Ω·cm or more, and a sealing member having such a volume resistivity exhibits favorable performance as a sealing member. The volume resistivity is measured in accordance with SRIS2301-1969, using a sheet with a thickness of 1 mm obtained by press-crosslinking the rubber composition at a pressure of 40 kgf/cm² at 150° C. for 10 minutes.

The fuel cell of the present invention comprises such a fuel cell sealing member of the present invention.

Hard Disk Drive Top Cover Gasket

The hard disk drive top cover gasket of the present invention preferably has, at a gasket portion, a crosslinked rubber sheet obtained by the method described above and having a compression set of 50% or less, whereby the resulting product exhibits sufficient sealing properties. In addition, the crosslinked rubber sheet preferably has a tensile strength of 2 MPa or more and a tensile elongation at break of 200% or more, whereby a problem that the rubber sheet is easily torn off in the production process can be suppressed. Furthermore, the crosslinked rubber sheet preferably has a hardness (JIS K6253) of less than 70 degrees. If the hardness is 70 degrees or more, the reaction force received when the cover-integrated gasket is mounted on a main body is increased. As a result, the cover is deformed and sealing cannot be completely performed, and thus the sealing properties required for a gasket may be degraded. The hardness is preferably 10 degrees or more. If the hardness is less than 10 degrees, a problem that the gasket is easily torn off, easily adheres, or the like occurs. The hardness is most preferably 20 to 40 degrees.

Examples of adhesives used for integrating the hard disk drive top cover with the gasket include epoxy resin adhesives, phenolic resin adhesives, isocyanate coupling agents, and silane coupling agents. As a method of applying the adhesive, an optimum method among dip application, spray application, screen printing, brush application, and stamping is selected according to need.

The hard disk drive top cover gasket of the present invention preferably has no voids due to foaming or the like, that is, the hard disk drive top cover gasket is preferably so-called void-free.

Sealing member for electric wire connector

The sealing member for an electric wire connector of the present invention comprises the above-described rubber composition of the present invention and is preferably, for example, a solid polymer type (solid polymer electrolyte type) sealing member for an electric wire connector.

The electric wire connector seal of the present invention preferably has a durometer A hardness, which indicates a surface hardness of the cured product layer, of 45 or less. The durometer A hardness is an indicator of hardness and can be measured in accordance with JIS K6253. A durometer A hardness of 45 or less can be achieved by variously controlling the proportions of various additives added to the composition, such as a reinforcing agent, a filler, and a plasticizer. An electric wire connector sealing member containing none of these various additives also exhibits a desired low hardness. The lower limit of the hardness is 5 or more. If the hardness is less than the lower limit, the sealing member is too soft and has poor performance for sealing the electric wire connector. However, an electric wire connector sealing member containing, as the reinforcing agent or the filler, substances that act as catalyst poisons such as sulfur and halogen compounds is not preferable.

The electric wire connector of the present invention comprises the seal for electric wire connector of the present invention as described above. The electric wire connector according to the present invention is particularly desirably an electric wire connector for automobiles.

EXAMPLES

Hereinafter, the present invention will be described more specifically with reference to Examples, but the present invention is not limited to those Examples.

Example 1

The following materials were kneaded within the range of 50° C. to 80° C. in a planetary mixer with a volume of 2 L [manufactured by Inoue MFG., INC., trade name: PLM-2 model]. The materials were 100 parts by weight of an ethylene/propylene/5-vinyl-2-norbornene random copolymer (PX-062 manufactured by Mitsui Chemicals, Inc., ethylene content: 52.7% by weight, VNB content: 4.7% by weight, iodine value: 9.5 g/100 g, complex viscosity at 25° C. (complex viscosity measured with a rheometer MCR301 manufactured by Anton Paar (Australia)): 1,100 Pa~S, intrinsic viscosity [η] as measured in a decalin solution at 135° C.: 0.28 dl/g); 15 parts by weight of carbon black (Asahi #50HG manufactured by Asahi Carbon Co., Ltd., amount of iodine adsorption: 19 mg/g, average particle diameter: 85 nm, amount of DBP absorption: 110 cm³/100 g); and 30 parts by weight of a surface-treated precipitated silica 1 (SS-95 manufactured by Tosoh Silica Corporation, BET specific surface area: 50 m²/g, secondary particle diameter (average particle diameter measured by the Coulter counter method): 2.4 μm, M value: 65). Subsequently, the resulting mixture was combined with 0.4 parts by weight of 3-(3,5-di-t-butyl-4-hydroxyphenyl)propionic acid stearate (Irganox 1076 manufactured by Ciba Specialty Chemicals) serving as an anti-aging agent, 0.4 parts by weight of platinum-1,3,5,7-tetravinylmethylcyclosiloxane complex (platinum concentration: 0.5% by weight, terminal vinylsiloxane oil solution) serving as a catalyst, 0.1 parts by weight of 1-ethynyl-1-cyclohexanol serving as a reaction inhibitor, 5 parts by weight of a compound represented by formula (II-1) below (hereinafter referred to as "crosslinking agent 1"), and 0.3 parts by weight of a compound represented by formula (III-1) below (hereinafter referred to as "crosslinking agent 2"), and then a rubber composition was prepared with a three-roll mill.

[Chem. 17]

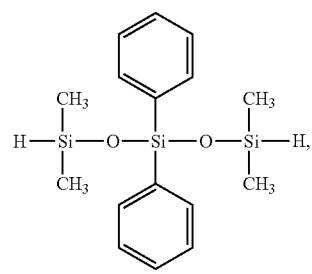

[II-1]

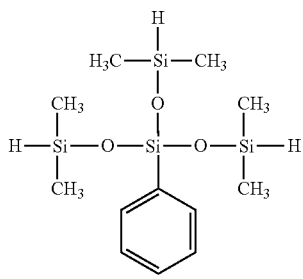

[III-1]

The rubber composition prepared was poured into a test sheet mold (140×100×2 mm) and compression molded at a hot plate set temperature of 150° C. and pressure for a mold compression of 80 MPa for 5 minutes to prepare a crosslinked rubber sheet. Furthermore, secondary vulcanization was conducted in an air oven at 150° C. for one hour to prepare the crosslinked rubber sheet.

Properties of the crosslinked rubber sheet prepared were measured or evaluated by the following methods. The results are shown in Table 1.

(1) Hardness

The A hardness was measured at a measuring temperature of 23° C. by the durometer method in accordance with JIS K6253.

(2) Tensile Test

A tensile test was conducted under the conditions of a measuring temperature of 23° C. and a tensile rate of 500 mm/min in accordance with JIS K6251. The tensile strength and the elongation at break of the crosslinked sheet were measured.

(3) Complex Viscosity (Zero-Shear Viscosity)

A complex viscosity of the rubber composition was measured at 25° C. with a rheometer MCR301 manufactured by Anton Paar (Australia). Note that the complex viscosity is preferably 5,000 Pa~sec or less from the viewpoint of achieve good moldability.

(4) Compression Set

Three 2-mm sheets were laminated, and a compression set was measured in accordance with JIS K6262 (1997) under the conditions of 150° C.×70 hours in air to determine the compression set ratio. As for the measuring condition, the measurement was performed after a high-temperature treatment under the conditions of 150° C.×70 to 500 hours.

A sealing member for stationary fuel cells for household use requires a capability of keeping the performance at 90° C. for 40,000 hours. In accordance with a result of the inventors' studies, an evaluation at 150° C. for 500 hours provides an evaluation nearly corresponding to an evaluation at the above condition at an accelerated rate. That is, the sheet with the compression set less than 80% at 150° C. for 500 hours has a capability of keeping the performance at 90° C. for 40,000 hours.

(5) TR recovery ratio

A low-temperature elastic recovery test (TR test) at -30° C. was conducted in accordance with JIS K6261 to determine the TR recovery ratio. Note that crosslinked rubber sheets with a recovery ratio of 55% or less cannot satisfy low-temperature properties desired in the present invention.

(6) Properties at elevated temperature (90° C.)

A tensile test was conducted under the conditions of a measuring temperature of 90° C. and a tensile rate of 500 mm/min in accordance with JIS K6251. Whereby the tensile strength and the elongation at break of the crosslinked sheet were measured. Note that crosslinked rubber sheets with an elongation at break at 90° C. of less than 200% cannot satisfy the performance desired in the present invention.

Example 2

A crosslinked rubber sheet was produced and the properties thereof were evaluated in the same manner as in Example 1 except that the crosslinking agent 2 was not used. The results are shown in Table 1.

Example 3

A crosslinked rubber sheet was produced and the properties thereof were evaluated in the same manner as in Example 1 except that the amount of crosslinking agent 1 was changed to 6.5 parts by weight and the amount of crosslinking agent 2 was changed to 0.3 parts by weight. The results are shown in Table 1.

Example 4

A crosslinked rubber sheet was produced and the properties thereof were evaluated in the same manner as in Example 1 except that the amount of crosslinking agent 1 was changed to 7 parts by weight and the amount of crosslinking agent 2 was changed to 1 part by weight. The results are shown in Table 1.

Example 5

A crosslinked rubber sheet was produced and the properties thereof were evaluated in the same manner as in Example 1 except that the amount of crosslinking agent 1 was changed to 3.5 parts by weight and the amount of crosslinking agent 2 was changed to 1 part by weight. The results are shown in Table 1.

Example 6

A crosslinked rubber sheet was produced and the properties thereof were evaluated in the same manner as in Example 1 except that 30 parts by weight of a surface-treated precipitated silica 2 (E743SS manufactured by Tosoh Silica Corporation, BET specific surface area: 45 m$^2$/g, secondary particle diameter: 1.7 μm, M value: 65) was used as the surface-modified silica instead of the surface-treated precipitated silica 1. The results are shown in Table 1.

Example 7

A crosslinked rubber sheet was produced and the properties thereof were evaluated in the same manner as in Example 1 except that 30 parts by weight of the surface-treated precipitated silica 2 (E743SS manufactured by Tosoh Silica Corporation, BET specific surface area: 45 m$^2$/g, secondary particle diameter: 1.7 μm, M value: 65) was used as the surface-modified silica instead of the surface-treated precipitated silica 1, and the crosslinking agent 2 was not used. The results are shown in Table 1.

Example 8

A crosslinked rubber sheet was produced and the properties thereof were evaluated in the same manner as in Example 1 except that the crosslinking agent 1 was not, used and the amount of crosslinking agent 2 was changed to 5 parts by weight. The results are shown in Table 1.

Comparative Example 1

A crosslinked rubber sheet was produced in the same manner as in Example 1 except that 30 parts by weight of a non-surface-treated precipitated silica 3 (E75 manufactured by Tosoh Silica Corporation, BET specific surface area: 54 m$^2$/g, secondary particle diameter: 2.3 µm, M value: 0) was used instead of the surface-treated precipitated silica 1, and the crosslinking agent 2 was not used. Properties of the crosslinked rubber sheet were evaluated. The results are shown in Table 2.

Comparative Example 2

A crosslinked rubber sheet was produced and the properties thereof were evaluated in the same manner as in Example 1 except that 30 parts by weight of a non-surface-treated precipitated silica 4 (E200 manufactured by Tosoh Silica Corporation, BET specific surface area: 132 m$^2$/g, secondary particle diameter: 3.3 µm, M value: 0) was used instead of the surface-treated precipitated silica 1, and the crosslinking agent 2 was not used. The results are shown in Table 2.

Comparative Example 3

A crosslinked rubber sheet was produced and the properties thereof were evaluated in the same manner as in Example 1 except that 30 parts by weight of a surface-treated precipitated silica 5 (SS10 manufactured by Tosoh Silica Corporation, BET specific surface area: 90 m$^2$/g, secondary particle diameter: 2.9 µm, M value: 65) was used as the surface-modified silica instead of the surface-treated precipitated silica 1, and the crosslinking agent 2 was not used. The results are shown in Table 2.

Comparative Example 4

A crosslinked rubber sheet was produced and the properties thereof were evaluated in the same manner as in Example 1 except that 30 parts by weight of a surface-treated precipitated silica 6 (SS70 manufactured by Tosoh Silica Corporation, BET specific surface area: 49 m$^2$/g, secondary particle diameter: 4.5 µm, M value: 65) was used as the surface-modified silica instead of the surface-treated precipitated silica 1, and the crosslinking agent 2 was not used. The results are shown in Table 2.

Comparative Example 5

A crosslinked rubber sheet was produced and the properties thereof were evaluated in the same manner as in Example 1 except that 30 parts by weight of a surface-treated precipitated silica 6 (SS70 manufactured by Tosoh Silica Corporation, BET specific surface area: 49 m$^2$/g, secondary particle diameter: 4.5 µm, M value: 65) was used as the surface-modified silica instead of the surface-treated precipitated silica 1. The results are shown in Table 2.

Comparative Example 6

A crosslinked rubber sheet was produced and the properties thereof were evaluated in the same manner as in Example 1 except that 30 parts by weight of a surface-treated precipitated silica 7 (SS30P manufactured by Tosoh Silica Corporation, BET specific surface area: 110 m$^2$/g, secondary particle diameter: 8.5 µm, M value: 55) was used as the surface-modified silica instead of the surface-treated precipitated silica 1, and the crosslinking agent 2 was not used. The results are shown in Table 2.

Comparative Example 7

A crosslinked rubber sheet was produced and the properties thereof were evaluated in the same manner as in Example 1 except that 40 parts by weight of talc (L-1 manufactured by Nippon Talc Co., Ltd., BET specific surface area: 11 m$^2$/g, secondary particle diameter: 4:9 µm) was used instead of the surface-treated precipitated silica 1, and the crosslinking agent 2 was not used. The results are shown in Table 2.

Comparative Example 8

A crosslinked rubber sheet was produced and the properties thereof were evaluated in the same manner as in Example 1 except that 40 parts by weight of surface-treated calcined kaolin (Translink 37 manufactured by BASF Corporation, secondary particle diameter: 1.4 µm) was used instead of the surface-treated precipitated silica 1, and the crosslinking agent 2 was not used. The results are shown in Table 2.

Properties of silica, talc etc. used in Examples and Comparative Examples are shown in Table 3.

TABLE 1

|  | Example 1 | Example 2 | Example 3 | Example 4 | Example 5 | Example 6 | Example 7 | Example 8 |
|---|---|---|---|---|---|---|---|---|
| Asahi #50HG | 15 | 15 | 15 | 15 | 15 | 15 | 15 | 15 |
| Precipitated silica-1 | 30 | 30 | 30 | 30 | 30 |  |  | 30 |
| Precipitated silica-2 |  |  |  |  |  | 30 | 30 |  |
| Precipitated silica-3 |  |  |  |  |  |  |  |  |
| Precipitated silica-4 |  |  |  |  |  |  |  |  |
| Precipitated silica-5 |  |  |  |  |  |  |  |  |
| Precipitated silica-6 |  |  |  |  |  |  |  |  |
| Precipitated silica-7 |  |  |  |  |  |  |  |  |
| Talc L-1 |  |  |  |  |  |  |  |  |
| Translink 37 |  |  |  |  |  |  |  |  |
| Crosslinking agent 1 | 5 | 5 | 6.5 | 7 | 3.5 | 5 | 5 | — |
| Crosslinking agent 2 | 0.3 | — | 0.3 | 1 | 1 | 0.3 | — | 5 |
| Values in ordinary state |  |  |  |  |  |  |  |  |
| Hardness (Duro-A) | 41 | 39 | 44 | 44 | 40 | 41 | 39 | 44 |
| Tensile strength (MPa) | 4.34 | 4.24 | 4.39 | 3.89 | 3.54 | 4.21 | 4.14 | 4.34 |
| Elongation (%) | 460 | 480 | 420 | 380 | 450 | 480 | 500 | 300 |
| Zero-shear viscosity (Pa · s) | 4,500 | 4,500 | 4,500 | 4,500 | 4,500 | 4,500 | 4,500 | 4,500 |

TABLE 1-continued

|  | Example 1 | Example 2 | Example 3 | Example 4 | Example 5 | Example 6 | Example 7 | Example 8 |
|---|---|---|---|---|---|---|---|---|
| Compression set test 150° C. | | | | | | | | |
| Compression set ratio (%) 70 h | 15 | 16 | 14 | 27 | 21 | 16 | 16 | 30 |
| Compression set ratio (%) 140 h | 22 | 24 | 21 | 34 | 27 | 23 | 24 | 39 |
| Compression set ratio (%) 280 h | 34 | 38 | 33 | 46 | 42 | 35 | 39 | 51 |
| Compression set ratio (%) 500 h | 48 | 53 | 47 | 63 | 64 | 49 | 54 | 67 |
| Properties at elevated temperature 90° C. | | | | | | | | |
| Tensile strength (MPa) | 1.7 | 1.6 | 1.7 | 1.6 | 1.4 | 1.5 | 1.5 | 1.3 |
| Elongation (%) | 250 | 260 | 230 | 220 | 240 | 270 | 270 | 150 |
| TR recovery ratio −30° C. (%) | 62 | 58 | 68 | 68 | 56 | 59 | 57 | 60 |

TABLE 2

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Asahi #50HG | 15 | 15 | 15 | 15 | 15 | 15 | 10 | 20 |
| Precipitated silica-1 | | | | | | | | |
| Precipitated silica-2 | | | | | | | | |
| Precipitated silica-3 | 30 | | | | | | | |
| Precipitated silica-4 | | 30 | | | | | | |
| Precipitated silica-5 | | | 30 | | | | | |
| Precipitated silica-6 | | | | 30 | 30 | | | |
| Precipitated silica-7 | | | | | | 30 | | |
| Talc L-1 | | | | | | | 40 | |
| Translink 37 | | | | | | | | 40 |
| Crosslinking agent 1 | 5 | 5 | 5 | 5 | 5 | 5 | 5 | 5 |
| Crosslinking agent 2 | — | — | — | — | 0.3 | — | — | — |
| Values in ordinary state | | | | | | | | |
| Hardness (Duro-A) | 40 | 42 | 40 | 39 | 40 | 41 | 38 | 43 |
| Tensile strength (MPa) | 4.12 | 4.23 | 4.31 | 4.34 | 4.42 | 4.34 | 2.74 | 2.92 |
| Elongation (%) | 490 | 470 | 450 | 470 | 450 | 480 | 450 | 430 |
| Zero-shear viscosity (Pa · s) | 6,000 | 7,500 | 8,800 | 4,800 | 4,800 | 11,500 | 6,000 | 4,000 |
| Compression set test 150° C. | | | | | | | | |
| Compression set ratio (%) 70 h | 16 | 20 | 23 | 19 | 17 | 22 | 29 | 30 |
| Compression set ratio (%) 140 h | 25 | 26 | 28 | 26 | 23 | 27 | 50 | 52 |
| Compression set ratio (%) 280 h | 38 | 39 | 43 | 39 | 36 | 40 | 70 | 73 |
| Compression set ratio (%) 500 h | 56 | 59 | 64 | 59 | 55 | 60 | 100 | 100 |
| Properties at elevated temperature 90° C. | | | | | | | | |
| Tensile strength (MPa) | 2.1 | 2.4 | 2.2 | 1.3 | 1.4 | 1.8 | 1.3 | 1.3 |
| Elongation (%) | 230 | 210 | 300 | 240 | 220 | 300 | 230 | 210 |
| TR recovery ratio −30° C. (%) | 42 | 40 | 47 | 50 | 52 | 46 | 50 | 52 |

TABLE 3

|  | Surface treatment Treated/Not treated | Average Particle diameter (μm) | The amount of iodine adsorption (mg/g) | BET specific surface area (m²/g) | M value |
|---|---|---|---|---|---|
| Asahi #50HG | | 85 | 19 | | |
| Precipitated silica-1 | Treated | 2.4 | | 50 | 65 |
| Precipitated silica-2 | Treated | 1.7 | | 45 | 65 |
| Precipitated silica-3 | Not treated | 2.3 | | 54 | 0 |
| Precipitated silica-4 | Not treated | 3.3 | | 132 | 0 |
| Precipitated silica-5 | Treated | 2.9 | | 90 | 65 |
| Precipitated silica-6 | Treated | 4.5 | | 49 | 65 |
| Precipitated silica-7 | Treated | 8.5 | | 110 | 55 |
| Talc L-1 | | 4.9 | | 11 | |
| Translink 37 | | 1.4 | | | |

The results showed the following: In Example 8, in which a large amount of crosslinking agent 2 was blended, although the crosslinked rubber sheet could be produced, the rubber sheet had a low elongation at break at 90° C., and thus the possibility of compression cracking increased. The crosslinked rubber sheets in Comparative Examples 4 and 5, in which silica having a large average particle diameter was blended, had poor low-temperature properties. In Comparative Examples 1 to 3 and Comparative Example 6, the compositions had high viscosities, and therefore, moldability might be insufficient. The crosslinked rubber sheets in Comparative Examples 7 and 8, in which fillers other than the surface-treated precipitated silica 1 were used, were poor in terms of long-term compression set (CS).

INDUSTRIAL APPLICABILITY

The rubber composition of the present invention is suitable for LIM molding and is suitably used in a fuel cell sealing member, various gasket members such as a hard disk drive top cover gasket member, a sealing member for an electric wire connector, and the like.

The invention claimed is:
1. A rubber composition comprising:
an ethylene/α-olefin/non-conjugated polyene copolymer [A] that satisfies (a) to (e) below:

(a) the copolymer is a copolymer of ethylene, an α-olefin, and a non-conjugated polyene,
(b) the α-olefin has 3 to 20 carbon atoms,
(c) the weight ratio of ethylene unit/α-olefin unit is 35/65 to 95/5,
(d) the iodine value is in the range of 0.5 to 50, and
(e) the intrinsic viscosity [η] is 0.01 to 5.0 dl/g as measured in a decalin solution at 135° C.;
carbon black [B] having an amount of iodine adsorption of 80 mg/g or less, an average particle diameter of 250 nm or less, and an amount of DBP absorption of 10 to 300 $CM^3$/100 g; and
surface-modified silica [C] that is obtained by subjecting precipitated silica to surface modification and has a BET specific surface area of 30 to 80 $m^2$/g, a particle diameter of 1.0 to 4.0 μm as measured by the Coulter counter method, and an M value of 50 or more.

2. The rubber composition according to claim 1, wherein the ethylene/α-olefin/non-conjugated polyene copolymer [A] further satisfies (f) below:
(f) the non-conjugated polyene is at least one kind of norbornene compound represented by general formula [I] below:

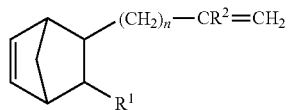

wherein n in formula [I] is an integer of 0 to 10, $R^1$ is a hydrogen atom or an alkyl group of 1 to 10 carbon atoms, and $R^2$ is a hydrogen atom or an alkyl group of 1 to 5 carbon atoms.

3. The rubber composition according to claim 1, wherein the carbon black [B] is contained in an amount of 1 to 40 parts by weight and the surface-modified silica [C] is contained in an amount of 20 to 60 parts by weight relative to 100 parts by weight of the total amount of the ethylene/α-olefin/non-conjugated polyene copolymer [A] and other resin components contained in the rubber composition.

4. The rubber composition according to claim 1, wherein the resin component in the rubber composition is only the ethylene/α-olefin/non-conjugated polyene copolymer [A].

5. The rubber composition according to claim 1, wherein the carbon black [B] has an amount of iodine adsorption of 15 to 40 mg/g, an average particle diameter of 40 to 100 nm, and an amount of DBP absorption of 40 to 150 $cm^3$/100 g.

6. The rubber composition according to claim 1, further comprising a crosslinking agent [D].

7. The rubber composition according to claim 6, wherein the crosslinking agent [D] contains an SiH group-containing compound (1) having two SiH groups in one molecule and represented by general formula [II] below:

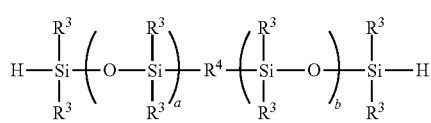

wherein $R^3$s in formula [II] are each a monovalent group having 1 to 10 carbon atoms and are each an unsubstituted or substituted saturated hydrocarbon group or an aromatic hydrocarbon group, $R^3$s may be the same or different in one molecule, a is an integer of 0 to 20, b is an integer of 0 to 20, and $R^4$ is a divalent organic group of 1 to 30 carbon atoms or an oxygen atom.

8. The rubber composition according to claim 6, wherein the crosslinking agent [D] contains an SiH group-containing compound (2) having three SiH groups in one molecule and represented by general formula [III] below:

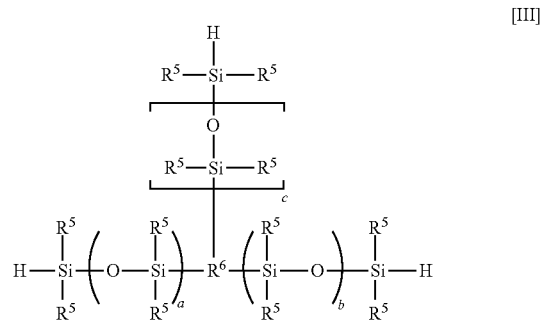

wherein $R^5$s in formula [III] are each a monovalent group having 1 to 10 carbon atoms and are each an unsubstituted or substituted saturated hydrocarbon group or an aromatic hydrocarbon group, $R^5$s may be the same or different in one molecule, a, b, and c are each independently an integer of 0 to 20, and $R^6$ is a trivalent organic group of 1 to 30 carbon atoms.

9. The rubber composition according to claim 7, wherein the SiH group-containing compound (1) having two SiH groups in one molecule is contained in an amount of 3.0 to 7.0 parts by weight relative to 100 parts by weight of the total amount of the ethylene/α-olefin/non-conjugated polyene copolymer [A] and other resin components contained in the rubber composition.

10. The rubber composition according to claim 8, wherein the SiH group-containing compound (2) having three SiH groups in one molecule is contained in an amount of 0.1 to 2.0 parts by weight relative to 100 parts by weight of the total amount of the ethylene/α-olefin/non-conjugated polyene copolymer [A] and other resin components contained in the rubber composition.

11. A fuel cell sealing member comprising the rubber composition according to claim 1.

12. A fuel cell comprising a fuel cell sealing member comprising the rubber composition according to claim 1.

13. A hard disk drive top cover gasket comprising the rubber composition according to claim 1.

14. A gasket material for liquid injection molding, comprising the rubber composition according to claim 1.

15. A hard disk drive comprising a hard disk drive top cover gasket comprising the rubber composition according to claim 1.

16. A sealing member for an electric wire connector comprising the rubber composition according to claim 1.

17. An electric wire connector comprising a sealing member for an electric wire connector comprising the rubber composition according to claim 1.

18. The electric wire connector according to claim 17, wherein the electric wire connector is an electric wire connector for automobiles.

* * * * *